(12) United States Patent
Huang et al.

(10) Patent No.: US 10,958,320 B2
(45) Date of Patent: Mar. 23, 2021

(54) COMMUNICATION METHOD, COMMUNICATIONS APPARATUS, AND SYSTEM

(71) Applicant: HUAWEI TECHNOLOGIES CO., LTD., Guangdong (CN)

(72) Inventors: Yi Huang, Shenzhen (CN); Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/930,864

(22) Filed: May 13, 2020

(65) Prior Publication Data

US 2020/0274585 A1    Aug. 27, 2020

Related U.S. Application Data

(63) Continuation of application No. PCT/CN2018/114857, filed on Nov. 9, 2018.

(30) Foreign Application Priority Data

Nov. 15, 2017 (CN) .......................... 201711131566.8

(51) Int. Cl.
*H04B 7/0456* (2017.01)
*H04B 7/06* (2006.01)
*H04W 72/04* (2009.01)

(52) U.S. Cl.
CPC .......... *H04B 7/0486* (2013.01); *H04B 7/063* (2013.01); *H04B 7/0639* (2013.01); *H04W 72/042* (2013.01)

(58) Field of Classification Search
CPC .... H04B 7/0486; H04B 7/063; H04B 7/0639; H04B 7/0456; H04W 72/042; H04L 25/03898; H04L 25/03; H04L 27/2636
See application file for complete search history.

(56) References Cited

U.S. PATENT DOCUMENTS

| | | | |
|---|---|---|---|
| 2016/0338040 A1 | 11/2016 | Lee et al. | |
| 2017/0311296 A1* | 10/2017 | Onggosanusi | H04B 7/0404 |
| 2018/0183503 A1* | 6/2018 | Rahman | H04W 72/042 |

FOREIGN PATENT DOCUMENTS

| | | |
|---|---|---|
| CN | 101789848 A | 7/2010 |
| CN | 102197603 A | 9/2011 |

(Continued)

OTHER PUBLICATIONS

3GPP TS 36.213 V14.0.0 (Sep. 2016), "3rd Generation Partnership Project; Technical Specification Group Radio Access Network; Evolved Universal Terrestrial Radio Access (E-UTRA); Physical layer procedures (Release 14)," Sep. 2016, 406 pages.

(Continued)

*Primary Examiner* — Vineeta S Panwalkar
(74) *Attorney, Agent, or Firm* — Fish & Richardson P.C.

(57) ABSTRACT

One example method includes receiving first indication information through a higher layer signaling, the first indication information indicating an available codebook subset, receiving downlink control information, determining a precoding matrix corresponding to a transmission precoding matrix indicator (TPMI) and a transmission rank obtained from the downlink control information, where the precoding matrix belongs to the available codebook subset indicated by the first indication information, precoding a signal based on the determined precoding matrix, and sending the precoded signal to a network device.

20 Claims, 4 Drawing Sheets

(56) References Cited

FOREIGN PATENT DOCUMENTS

| CN | 102223212 A | 10/2011 |
| CN | 104303442 A | 1/2015 |
| CN | 106911373 A | 6/2017 |
| EP | 2621102 A2 | 7/2013 |
| EP | 2675082 A2 | 12/2013 |

OTHER PUBLICATIONS

3GPP TS 38.211 V1.0.0 (Sep. 2017), "3rd Generation Partnership Project; Technical Specification Group Radio Access Network; NR; Physical channels and modulation (Release 15)," Sep. 2017, 37 pages.

3GPP TS 38.212 V1.0.0 (Sep. 2017), "3rd Generation Partnership Project; Technical Specification Group Radio Access Network; NR; Multiplexing and channel coding (Release 15)," Sep. 2017, 28 pages.

3GPP TS 38.214 V1.0.0 (Sep. 2017), "3rd Generation Partnership Project; Technical Specification Group Radio Access Network; NR; Physical layer procedures for data (Release 15)," Sep. 2017, 32 pages.

LG Electronics et al., "WF on 4Tx UL codebook for DFTs-OFDM," 3GPP TSG RAN WG1 Meeting RAN1#90bis, R1-1718897, Prague, Czech Republic, Oct. 9-13, 2017, 3 pages.

Office Action issued in Chinese Application No. 201880051818.2 dated Aug. 26, 2020, 13 pages (with English translation).

PCT International Search Report and Written Opinion issued in International Application No. PCT/CN2018/114857 dated Jan. 30, 2019, 15 pages (with English translation).

Extended European Search Report issued in European Application No. 18878148.8 dated Nov. 10, 2020, 15 pages.

MediaTek Inc., "Codebook based transmission for UL," 3GPP TSG RAN WG1 Meeting NR#3,, R1-1716785, Nagoya, Japan, Sep. 18-21, 2017, 22 pages.

ZTE, Sanechips, "Codebook based UL transmission," 3GPP TSG RAN WG1 Meeting 90bis, Prague, CZ, Oct. 9-13, 2017, R1-1717417, 6 pages.

* cited by examiner

COMMUNICATION METHOD, COMMUNICATIONS APPARATUS, AND SYSTEM

CROSS-REFERENCE TO RELATED APPLICATIONS

This application is a continuation of International Patent Application No. PCT/CN2018/114857, filed on Nov. 9, 2018, which claims priority to Chinese Patent Application No. 201711131566.8, filed on Nov. 15, 2017. The disclosures of the aforementioned applications are hereby incorporated by reference in their entireties.

TECHNICAL FIELD

This application relates to the wireless communications field, and more specifically, to a communication method, a communications apparatus, and a system.

BACKGROUND

In a massive multiple-input multiple-output (Massive MIMO) technology, interference between a plurality of users and interference between a plurality of signal streams of a same user may be reduced through precoding, which helps improve signal quality, implement spatial multiplexing, and improve spectrum utilization.

Currently, a plurality of transmission forms such as coherent transmission, partial coherent transmission, and non-coherent transmission are proposed for uplink transmission, so as to adapt to different scenarios. However, in a current uplink codebook, the foregoing plurality of transmission forms are not fully considered. For example, in codebooks with ranks of 2 and 3, only partial non-coherent transmission is supported. In a codebook with a rank of 4, only non-coherent transmission is supported. Even if a terminal device has a corresponding capability, flexibility of a transmission form of the terminal device is limited by the current codebook.

SUMMARY

This application provides a communication method, a communications apparatus, and a system, to improve transmission flexibility of a terminal device.

According to a first aspect, a communication method is provided, including:

sending, by a network device, a precoding matrix indicator PMI and a rank indication RI, where the PMI and the RI are used to indicate a precoding matrix in a codebook, and a rank of the precoding matrix is greater than 1; where the codebook includes at least two types of a first-type precoding matrix, a second-type precoding matrix, and a third-type precoding matrix, each column vector of any matrix in the first-type precoding matrix includes only one non-zero element, non-zero elements in any two column vectors are located in different rows, at least one column vector of any matrix in the second-type precoding matrix includes at least one zero element and at least two non-zero elements, each element in any matrix in the third-type precoding matrix is a non-zero element, and any two column vectors of any matrix in the third-type precoding matrix are orthogonal to each other.

Based on the foregoing codebook, when a terminal device has a corresponding capability, the terminal device may communicate with one or more network devices in at least two transmission forms of coherent transmission, partial coherent transmission, and non-coherent transmission. Therefore, transmission flexibility of the terminal device is improved, and different transmission forms are used, so that different transmission requirements can be met, and resource utilization is improved.

Optionally, the PMI and the RI are carried in downlink control information (DCI).

With reference to the first aspect, in some implementations of the first aspect, the method further includes:

sending, by the network device, first indication information, where the first indication information indicates a set of available precoding matrices, or the first indication information indicates an available codebook subset, and the codebook subset includes at least one type of the first-type precoding matrix, the second-type precoding matrix, and the third-type precoding matrix.

Optionally, the first indication information is carried in higher layer signaling. For example, the higher layer signaling may include a Radio Resource Control (RRC) message or a Media Access Control (MAC)-control element (CE) message.

Optionally, the first indication information is a codebook subset restriction (CSR).

The available precoding matrix is indicated by using the higher layer signaling, which may limit a bit quantity of the PMI, thereby reducing bit overheads of the PMI.

Optionally, the first indication information is a bitmap, the bitmap includes at least one indication bit, and when the first indication information indicates a set of available precoding matrices, each indication bit is corresponding to one precoding matrix, and each indication bit indicates whether the corresponding precoding matrix is an available precoding matrix.

Optionally, the first indication information is a bitmap, the bitmap includes at least one indication bit, and when the first indication information indicates an available codebook subset, each indication bit is corresponding to one codebook subset, and each indication bit indicates whether a precoding matrix in the corresponding codebook subset is an available precoding matrix.

It should be understood that, indicating the available precoding matrix by using the bitmap is only one possible implementation. For example, the network device may further indicate different types of precoding matrices by using different values of the indication bit carried in the first indication information.

With reference to the first aspect, in some implementations of the first aspect, the method further includes:

sending, by the network device, second indication information, where the second indication information is used to indicate a set of codebooks corresponding to a discrete Fourier transform spread orthogonal frequency division multiplexing DFT-s-OFDM waveform; or sending, by the network device, third indication information, where the third indication information is used to indicate a set of codebooks corresponding to a cyclic prefix-orthogonal frequency division multiplexing CP-OFDM waveform, where the set of codebooks corresponding to the DFT-s-OFDM waveform includes at least one codebook corresponding to at least one rank, each codebook in the set of codebooks corresponding to the DFT-s-OFDM waveform includes the first-type precoding matrix and the second-type precoding matrix, the set of codebooks corresponding to the CP-OFDM waveform includes at least one codebook corresponding to at least one rank, each codebook in the set of codebooks corresponding to the CP-OFDM waveform includes at least two types of the first-type precoding matrix, the second-type precoding matrix, and the third-type precoding matrix, each column vector of any matrix in the first-type precoding matrix includes only one non-zero element, non-zero elements in any two column vectors are located in different rows, at least one column vector of any matrix in the second-type precoding matrix includes at least one zero element and at least two non-zero elements, each element in any matrix in the third-type precoding matrix is a non-zero element, and any two column vectors of any matrix in the third-type precoding matrix are orthogonal to each other.

Optionally, the second indication information is carried in higher layer signaling.

Optionally, the third indication information is carried in higher layer signaling.

The higher layer signaling may include, for example, an RRC message or a MAC-CE message.

It should be noted that the second indication information and the third indication information may be carried in two different pieces of higher layer signaling, and the network device may send, at a same moment, only one of the higher layer signaling used to carry the second indication information and the higher layer signaling used to carry the third indication information.

It should be further noted that if the codebook corresponding to the CP-OFDM waveform includes only the first-type precoding matrix and the second-type preceding matrix, the set of codebooks corresponding to the DFT-s-OFDM waveform and the set of codebooks corresponding to the CP-OFDM waveform are the same.

According to a second aspect, a communication method is provided, including:

receiving, by a terminal device, a precoding matrix indicator PMI and a rank indication RI, where the PMI and the RI are used to indicate a precoding matrix in a codebook, and a rank of the preceding matrix is greater than 1; and precoding a signal based on the precoding matrix determined by using the PMI and the RI, and sending a precoded signal, where the codebook includes at least two types of a first-type precoding matrix, a second-type preceding matrix, and a third-type preceding matrix, each column vector of any matrix in the first-type precoding matrix includes only one non-zero element, non-zero elements in any two column vectors are located in different rows, at least one column vector of any matrix in the second-type precoding matrix includes at least one zero element and at least two non-zero elements, each element in any matrix in the third-type precoding matrix is a non-zero element, and any two column vectors of any matrix in the third-type precoding matrix are orthogonal to each other.

Based on the foregoing codebook, when the terminal device has a corresponding capability, the terminal device may communicate with one or more network devices in at least two transmission forms of coherent transmission, partial coherent transmission, and non-coherent transmission. Therefore, transmission flexibility of the terminal device is improved, and different transmission forms are used, so that different transmission requirements can be met, and resource utilization is improved.

Optionally, the PMI and the RI are carried in downlink control information DCI.

With reference to the second aspect, in some implementations of the second aspect, the method further includes:

receiving, by the terminal device, first indication information, where the first indication information indicates a set of available precoding matrices, or the first indication information indicates an available codebook subset, and the codebook subset includes at least one type of the first-type precoding matrix, the second-type precoding matrix, and the third-type precoding matrix.

Optionally, the first indication information is carried in higher layer signaling. The higher layer signaling may include, for example, an RRC message or a MAC-CE.

The available precoding matrix is indicated by using the higher layer signaling, which may limit a bit quantity of the PMI, thereby reducing bit overheads of the PMI.

Optionally, the first indication information is a bitmap, the bitmap includes at least one indication bit, and when the first indication information indicates a set of available precoding matrices, each indication bit is corresponding to one precoding matrix, and each indication bit indicates whether the corresponding precoding matrix is an available precoding matrix.

Optionally, the first indication information is a bitmap, the bitmap includes at least one indication bit, and when the first indication information indicates an available codebook subset, each indication bit is corresponding to one codebook subset, and each indication bit indicates whether a precoding matrix in the corresponding codebook subset is an available precoding matrix.

It should be understood that, indicating the available precoding matrix by using the bitmap is only one possible implementation. For example, the network device may further indicate different types of precoding matrices by using different values of the indication bit carried in the first indication information.

With reference to the second aspect, in some implementations of the second aspect, the method further includes:

receiving, by the terminal device, second indication information, where the second indication information is used to indicate a set of codebooks corresponding to a discrete Fourier transform spread orthogonal frequency division multiplexing DFT-s-OFDM waveform; or receiving, by the terminal device, third indication information, where the third indication information is used to indicate a set of codebooks corresponding to a cyclic prefix-orthogonal frequency division multiplexing CP-OFDM waveform, where the set of codebooks corresponding to the DFT-s-OFDM waveform includes at least one codebook corresponding to at least one rank, each codebook in the set of codebooks corresponding to the DFT-s-OFDM waveform includes the first-type precoding matrix and the second-type preceding matrix, the set of codebooks corresponding to the CP-OFDM waveform includes at least one codebook corresponding to at least one rank, each codebook in the set of codebooks corresponding to the CP-OFDM waveform includes at least two types of the first-type precoding matrix, the second-type preceding matrix, and the third-type precoding matrix, each column vector of any matrix in the first-type precoding matrix includes only one non-zero element, non-zero elements in any two column vectors are located in different rows, at least one column vector of any matrix in the second-type precoding matrix includes at least one zero element and at least two non-zero elements, each element in any matrix in the third-type precoding matrix is a non-zero element, and any two column vectors of any matrix in the third-type precoding matrix are orthogonal to each other.

Optionally, the second indication information is carried in higher layer signaling.

Optionally, the third indication information is carried in higher layer signaling.

The higher layer signaling may include, for example, an RRC message or a MAC-CE message.

It should be noted that the second indication information and the third indication information may be carried in two different pieces of higher layer signaling, and the network device may send, at a same moment, only any one of the higher layer signaling used to carry the second indication information and the higher layer signaling used to carry the third indication information.

It should be further noted that if the codebook corresponding to the CP-OFDM waveform includes only the first-type precoding matrix and the second-type precoding matrix, the set of codebooks corresponding to the DFT-s-OFDM waveform and the set of codebooks corresponding to the CP-OFDM waveform may be the same.

According to a third aspect, an apparatus is provided. The apparatus provided in this application has a function of implementing behavior of the network device or the terminal device in the aspects of the foregoing methods, and includes corresponding means configured to implement the steps or the functions described in the aspects of the foregoing methods. The steps or the functions may be implemented by using software, hardware, or a combination of the software and the hardware.

In a possible design, the apparatus includes one or more processors and a communications unit. The one or more processors are configured to support the apparatus in performing a corresponding function of the network device in the foregoing method, for example, generating a PMI and an RI. The communications unit is configured to support the apparatus in communicating with another device, to implement a receiving and/or sending function, for example, send the PMI and the RI.

Optionally, the apparatus may further include one or more memories, where the memory is configured to couple to the processor and store a program instruction and/or data necessary for the network device. The one or more memories may be integrated with the processor, or may be separately disposed with the processor. This is not limited in this application.

The apparatus may be a base station, a gNB, a TRP, or the like. The communications unit may be a transceiver or a transceiver circuit. Optionally, the transceiver may be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the network device in the first aspect or any possible implementation of the first aspect.

In a possible design, the apparatus includes one or more processors and a communications unit. The one or more processors are configured to support the apparatus in performing a corresponding function of the terminal device in the foregoing method, for example, determining a precoding matrix based on a PMI and an RI, and precoding a signal. The communications unit is configured to support the apparatus in communicating with another device, to implement a receiving and/or sending function, for example, receive the PMI and the RI, or send a precoded signal.

Optionally, the apparatus may further include one or more memories, where the memory is configured to couple to the processor and store a program instruction and/or data necessary for the apparatus. The one or more memories may be integrated with the processor, or may be separately disposed with the processor. This is not limited in this application.

The apparatus may be an intelligent terminal, a wearable device, or the like. The communications unit may be a transceiver or a transceiver circuit. Optionally, the transceiver may be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the terminal device in the second aspect or any possible implementation of the second aspect.

According to a fourth aspect, a system is provided, where the system includes the foregoing terminal device and network device.

According to a fifth aspect, a computer readable storage medium is provided and is configured to store a computer program. The computer program includes an instruction used to perform the method in the first aspect or any possible implementation of the first aspect.

According to a sixth aspect, a computer readable storage medium is provided and is configured to store a computer program. The computer program includes an instruction used to perform the method in the second aspect or any possible implementation of the second aspect.

According to a seventh aspect, a computer program product is provided, the computer program product includes computer program code, and when the computer program code runs on a computer, the computer is enabled to perform the method in the first aspect or any possible implementation of the first aspect.

According to an eighth aspect, a computer program product is provided, the computer program product includes computer program code, and when the computer program code runs on a computer, the computer is enabled to perform the method in the second aspect or any possible implementation of the second aspect.

In any possible implementation of the foregoing aspects, optionally, the first-type precoding matrix meets at least one of the following:

$$W_1 = \frac{1}{2}\begin{bmatrix} 1 & 0 \\ 0 & 1 \\ 0 & 0 \\ 0 & 0 \end{bmatrix},$$

or a matrix that has a row and/or column transform relationship with $W_1$.

The precoding matrix may support that power equalization between antenna ports is implemented, and total transmit power may be evenly allocated to each antenna port, so that a requirement on performance of a power amplifier of the terminal device can be reduced.

Optionally, the first-type precoding matrix meets at least one of the following:

$$W_2 = \frac{1}{\sqrt{2}}\begin{bmatrix} 1 & 0 \\ 0 & 1 \\ 0 & 0 \\ 0 & 0 \end{bmatrix},$$

or a matrix that has a row and/or column transform relationship with $W_2$.

The precoding matrix may support that power equalization between signal streams is implemented, and therefore transmit power may be fully used to ensure signal quality.

Optionally, the first-type precoding matrix meets at least one of the following:

$$W_4 = \frac{1}{2}\begin{bmatrix} 1 & 0 & 0 \\ 0 & 1 & 0 \\ 0 & 0 & 1 \\ 0 & 0 & 0 \end{bmatrix},$$

or a matrix that has a row and/or column transform relationship with $W_4$.

The precoding matrix may support that power equalization between antenna ports, total transmit power may be evenly allocated to each antenna port, so that a requirement on a power amplifier of the terminal device can be reduced.

Optionally, the first-type precoding matrix meets at least one of the following:

$$W_5 = \frac{1}{\sqrt{3}}\begin{bmatrix} 1 & 0 & 0 \\ 0 & 1 & 0 \\ 0 & 0 & 1 \\ 0 & 0 & 0 \end{bmatrix},$$

or a matrix that has a row and/or column transform relationship with $W_5$.

The precoding matrix may support that power equalization between signal streams is implemented, and therefore transmit power may be fully used to ensure signal quality.

Optionally, the second-type precoding matrix meets at least one of the following:

$$W_8 = \frac{1}{\sqrt{6}}\begin{bmatrix} 1 & 0 & 1 \\ 0 & 1 & 0 \\ \varphi_1 & 0 & -\varphi_1 \\ 0 & \varphi_2 & 0 \end{bmatrix},$$

or a matrix that has a row and/or column transform relationship with $W_8$.

Optionally, $\varphi_1 \in \{1, -1, -j\}$, $\varphi_2 \in \{1, -1, j, -j\}$, and j is an imaginary unit.

Alternatively, optionally, $\varphi_1 \in \{1, \sqrt{1/2}, \sqrt{1/4}, \sqrt{1/8}, \sqrt{1/16}\}$, and $\varphi_2 \in \{1, \sqrt{1/2}, \sqrt{1/4}, \sqrt{1/8}, \sqrt{1/16}\}$.

It should be understood that values of $\varphi_1$ and $\varphi_2$ may be the same or may be different. This is not limited in this application.

The precoding matrix may support that power equalization between signal streams is implemented, and therefore transmit power may be fully used to ensure signal quality.

Optionally, the second-type precoding matrix meets at least one of the following:

$$W_9 = \begin{bmatrix} 1 & 0 & 1 \\ 0 & 1 & 0 \\ \varphi_1 & 0 & -\varphi_1 \\ 0 & \varphi_2 & 0 \end{bmatrix} H_1,$$

or a matrix that has a row and/or column transform relationship with $W_9$, or $$W_{10} = H_2 \begin{bmatrix} 1 & 0 & 1 \\ 0 & 1 & 0 \\ \varphi_1 & 0 & -\varphi_1 \\ 0 & \varphi_2 & 0 \end{bmatrix},$$

or a matrix that has a row and/or column transform relationship with $W_{10}$, where $H_1$ and $H_2$ are coefficient matrices. Optionally, $\varphi_1 \in \{1, -1, -j\}$, $\varphi_2 \in \{1, -1, j, -j\}$, and j is an imaginary unit. Alternatively, optionally, $\varphi_1 \in \{1, \sqrt{1/2}, \sqrt{1/4}, \sqrt{1/8}, \sqrt{1/16}\}$, and $\varphi_2 \in \{1, \sqrt{1/2}, \sqrt{1/4}, \sqrt{1/8}, \sqrt{1/16}\}$.

It should be understood that values of 43 and q, may be the same or may be different. This is not limited in this application.

Optionally, $$H_1 = \begin{bmatrix} \frac{1}{\sqrt{8}} & 0 & 0 \\ 0 & \frac{1}{4} & 0 \\ 0 & 0 & \frac{1}{\sqrt{8}} \end{bmatrix} \text{ or } H_1 = \begin{bmatrix} \frac{1}{\sqrt{8}} \\ \frac{1}{4} \\ \frac{1}{\sqrt{8}} \end{bmatrix}.$$

Optionally, $$H_2 = \begin{bmatrix} \frac{1}{\sqrt{8}} & 0 & 0 & 0 \\ 0 & \frac{1}{4} & 0 & 0 \\ 0 & 0 & \frac{1}{\sqrt{8}} & 0 \\ 0 & 0 & 0 & \frac{1}{4} \end{bmatrix} \text{ or } H_2 = \begin{bmatrix} \frac{1}{\sqrt{8}} & \frac{1}{4} & \frac{1}{\sqrt{8}} & \frac{1}{4} \end{bmatrix}.$$

In the design of the precoding matrix, power equalization between antenna ports in an antenna port group can be implemented, and total transmit power may be evenly allocated to each antenna port, so that a requirement on a power amplifier of the terminal device can be reduced.

Optionally, the second-type precoding matrix includes at least one of the following:

$$W_{11} = \frac{1}{\sqrt{8}} \begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix},$$

or a matrix that has a row and/or column transform relationship with $W_{11}$.

Optionally, $\varphi_1 \in \{1, -1, -j\}$, $\varphi_2 \in \{1, -1, j, -j\}$, and j is an imaginary unit.

Optionally, $\varphi_1 \in \{1, \sqrt{1/2}, \sqrt{1/4}, \sqrt{1/8}, \sqrt{1/16}\}$, and $\varphi_2 \in \{1, \sqrt{1/2}, \sqrt{1/4}, \sqrt{1/8}, \sqrt{1/16}\}$.

It should be understood that values of q and may be the same or may be different. This is not limited in this application. Power equalization between streams may be implemented in the precoding matrix.

Optionally, a structure of the third-type precoding matrix includes at least one of the following:

$$U_3^1 = \begin{bmatrix} b_{k_1} \\ \alpha b_{k_2} \end{bmatrix},$$

or a matrix that has a row and/or column transform relationship with $U_3^1$, or $$U_3^2 = \begin{bmatrix} b_{k_1} & b_{k_1+x_1 O} \\ \alpha b_{k_2} & \alpha b_{k_2+x_2 O} \end{bmatrix},$$

or a matrix that has a row and/or column transform relationship with $U_3^2$, or $$U_3^3 = \begin{bmatrix} b_{k_1} & b_{k_1} & b_{k_1+x_1 O} \\ \alpha b_{k_2} & -\alpha b_{k_2} & \alpha b_{k_2+x_2 O} \end{bmatrix},$$

or a matrix that has a row and/or column transform relationship with $U_3^3$, or $$U_3^4 = \begin{bmatrix} b_{k_1} & b_{k_1} & b_{k_1+x_1 O} & b_{k_1+x_1 O} \\ \alpha b_{k_2} & -\alpha b_{k_2} & \alpha b_{k_2+x_2 O} & -\alpha b_{k_2+x_2 O} \end{bmatrix},$$

or a matrix that has a row and/or column transform relationship with $U_3^4$, or a matrix including any two or three columns in $U_3^4$, or a matrix including any two or three columns in the matrix that has a row and/or column transform relationship with $U_3^4$, where $\alpha \in \{1, -1, j, -j\}$, j is an imaginary unit, $b_{k_1}$, $b_{k_2}$, $b_{k_1+x_1 O}$, and $b_{k_2+x_2 O}$ are discrete Fourier transform DFT vectors and meet $$b_{k_1} = \begin{bmatrix} 1 \\ e^{j\frac{2\pi k_1}{N/2 \cdot O}} \end{bmatrix},$$

$$b_{k_2} = \begin{bmatrix} 1 \\ e^{j\frac{2\pi k_2}{N/2 \cdot O}} \end{bmatrix},$$

$$b_{k_1+x_1 O} = \begin{bmatrix} 1 \\ e^{j\frac{2\pi(k_1+x_1 O)}{N/2 \cdot O}} \end{bmatrix}, \text{ and}$$

$$b_{k_2+x_2 O} = \begin{bmatrix} 1 \\ e^{j\frac{2\pi(k_2+x_2 O)}{N/2 \cdot O}} \end{bmatrix},$$

N is an antenna port quantity, N=4, O=2, $x_1 \in \{0, 1\}$, and $x_2 \varepsilon \{0, 1\}$.

For the structure of the precoding matrix, it does not need to require that two DFT vectors that constitute one column vector point to a same beam direction. In this way, a selection range of the precoding matrix may be expanded, thereby increasing a minimal Grassmannian distance of the codebook, and facilitating system performance improvement.

It should be noted that the precoding matrix may be obtained through transformation by using the structure of the precoding matrix provided above. The "transformation" may include but is not limited to row and/or column transform, and/or normalization processing.

Optionally, the precoding matrix in the third-type codebook subset includes $W_M$ and $$W_M = \frac{1}{\sqrt{M \times N}} U_3^M.$$

M is a rank, M is an integer greater than or equal to 1, N is the antenna port quantity, N≥M, and N is an integer.

Optionally, the third-type preceding matrix includes $W_M$, where $W_M$ includes M column vectors in $W_0$, and $W_0$ and any precoding matrix u in a codebook with a rank of 1 meet the following mathematical transform relationship:

$$W_0 = I - 2uu^H u^H u,$$

where M is a rank, M is an integer greater than or equal to 1, I is an identity matrix, and $u^H$ is a conjugate transpose matrix of u.

Optionally, the third-type preceding matrix includes $W_M$, where $W_M$ includes M precoding matrices in a codebook with a rank of 1, M is a rank, and M is an integer greater than or equal to 1.

Based on the designs of the various precoding matrices enumerated above, a selection range of the precoding matrix can be expanded, thereby increasing a minimal Grassmannian distance of the codebook, and facilitating system performance improvement.

DESCRIPTION OF EMBODIMENTS

The following describes technical solutions of this application with reference to accompanying drawings.

The technical solutions of the embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, Universal Mobile Telecommunications System (UMTS), a Worldwide Interoperability for Microwave Access (WiMAX) communications system, a future 5th generation (5G) system, a new radio access technology (NR), or the like.

Figure 1:
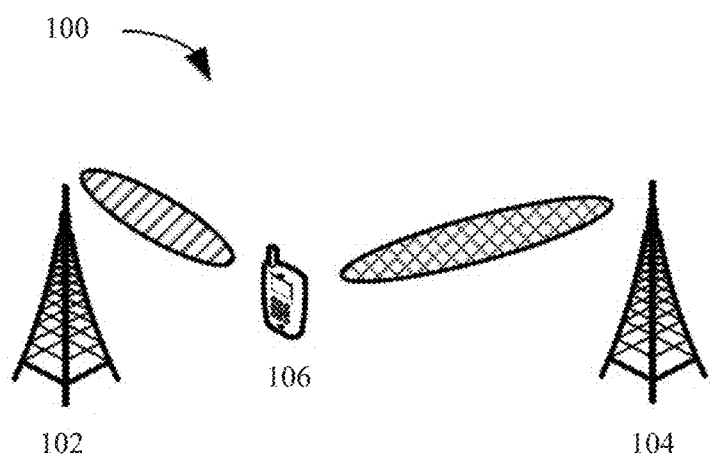
FIG. 1 is a schematic diagram of a communications system of a communication method applicable to an embodiment of this application.

For ease of understanding the embodiments of this application, first a communications system shown in FIG. 1 is used as an example to describe in detail a communications system applicable to the embodiments of this application. FIG. 1 is a schematic diagram of a communications system of a communication method applicable to an embodiment of this application. As shown in FIG. 1, the communications system 100 includes a network device 102 and a terminal device 106. The network device 102 may be configured with a plurality of antennas, and the terminal device may also be configured with a plurality of antennas. Optionally, the communications system may further include a network device 104, and the network device 104 may also be configured with a plurality of antennas.

It should be understood that the network device 102 or the network device 104 may further include a plurality of components (for example, a processor, a modulator, a multiplexer, a demodulator, or a demultiplexer) related to signal sending and receiving.

The network device may be any device that has a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base station (for example, Home evolved NodeB or Home NodeB, HNB), a baseband unit (BBU), an access point (AP) in a Wireless Fidelity (Wi-Fi) system, a wireless relay node, a wireless backhaul node, a transmission point (TRP or TP), and the like, or may be a gNB or a transmission point (TRP or TP) in a 5G system such as an NR system, one or one group of antenna panels (including a plurality of antenna panels) of a base station in a 5G system, or may be a network node forming a gNB or a transmission point, such as a baseband unit (BBU) or a distributed unit (DU).

In some deployment, the gNB may include a centralized unit (CU) and a DU. The gNB may further include a radio frequency unit (radio unit, RU). The CU implements a part of functions of the gNB, and the DU implements a part of the functions of the gNB. For example, the CU implements functions of a radio resource control (RRC) layer and a Packet Data Convergence Protocol (PDCP) layer, and the DU implements functions of a Radio Link Control (RLC) layer, a Media Access Control (MAC) layer, and a physical (PHY) layer. Information at the RRC layer may finally become information at the PHY layer, or may be converted from information at the PHY layer. Therefore, in this architecture, higher layer signaling such as RRC layer signaling or PHCP layer signaling may also be considered as being sent by the DU, or being sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and a chip that can be disposed in the foregoing terminal device are collectively referred to as a terminal device.

In the communications system 100, both the network device 102 and the network device 104 may communicate with a plurality of terminal devices (such as the terminal device 106 shown in the figure). The network device 102 and the network device 104 may communicate with any quantity of terminal devices similar to the terminal device 106. However, it should be understood that a terminal device that communicates with the network device 102 and a terminal device that communicates with the network device 104 may be the same or may be different. The terminal device 106 shown in FIG. 1 may communicate with the network device 102 and the network device 104 at the same time. However, this shows only one possible scenario. In some scenarios, the terminal device may communicate with only the network device 102 or the network device 104. This is not limited in this application.

It should be understood that, FIG. 1 is only a simplified schematic diagram used as an example for ease of understanding. The communications system may further include another network device or may further include another terminal device, which is not drawn in FIG. 1.

For ease of understanding the embodiments of this application, the following briefly describes a process of processing a signal (for example, including a reference signal or data) on a physical channel in an LTE system. A code word from a higher layer may be processed on a physical channel, and the code word may be a coded (for example, including channel coding) bit stream. The code word is scrambled to generate a scrambled bit stream. The scrambled bit stream undergoes modulation mapping to obtain a modulation symbol stream. The modulation symbol stream is mapped to a plurality of layers through layer mapping. For ease of differentiation and description, in the embodiments of this application, a symbol obtained after layer mapping may be referred to as a layer-mapped signal stream (or referred to as a symbol stream or a spatial stream). The layer-mapped signal stream undergoes precoding to obtain a plurality of precoded signal streams (or referred to as precoded symbol streams). After the precoded signal stream undergoes resource element (RE) mapping, the precoded signal stream is mapped to a plurality of REs. These REs are then modulated through orthogonal frequency division multiplexing (OFDM) to generate OFDM symbol streams. The OFDM symbol streams are then transmitted through an antenna port.

However, a person skilled in the art should understand that the various signal streams mentioned in this application are modulation symbol streams. It should be further understood that terms defined for ease of differentiation, such as the layer-mapped signal stream and the precoded signal stream, should not constitute any limitation on this application. This application does not exclude a possibility that other names are used in an existing or future protocol to replace the foregoing names. Although signal streams appearing at a plurality of places in the following are not described in detail, a person skilled in the art may understand, according to an execution sequence of the foregoing processes, specific meanings of signal streams at each place.

Based on the foregoing processing process, the network device 102 may send downlink signals to a plurality of terminal devices by using a plurality of antennas, and the terminal device may send uplink signals to a same network device (for example, the network device 102 shown in the figure) or different network devices (for example, the network device 102 and the network device 104 shown in the figure) by using a plurality of antennas. In a MIMO technology, interference between a plurality of users and interference between a plurality of signal streams of a same user may be reduced through precoding.

Precoding may mean that when a channel state is known, a to-be-transmitted signal is pre-processed on a transmit end, that is, the to-be-transmitted signal is processed by using a precoding matrix that matches a channel resource, so that the to-be-transmitted signal that has been precoded is adapted to a channel, and complexity of eliminating inter-channel impact on a receive end is reduced. Therefore, the transmit signal is precoded, so that received signal quality (for example, a signal to interference plus noise ratio (SINR)) is improved. Therefore, transmission between a transmit end device and a plurality of receive end devices may be implemented on a same time-frequency resource through precoding, that is, multi-user multiple-input multiple-output (MU-MIMO) is implemented. It should be noted that related description of precoding is only used as an example, and is not used to limit the protection scope of the embodiments of this application. In a specific implementation process, precoding may be further performed in another manner (for example, when a channel matrix cannot be learned of, precoding is performed by using a preset precoding matrix or in a weighted processing manner). Details are not described in this specification.

In a possible implementation, to obtain a precoding matrix that can be adapted to a channel, the transmit end device may first perform channel measurement by sending a reference signal, so as to determine a relatively accurate precoding matrix to precode a to-be-sent signal. Specifically, the transmit end device may be a network device, and the receive end device may be a terminal device. The reference signal may be a reference signal used for downlink channel measurement, for example, a channel state information reference signal (CSI-RS). The terminal device may perform CSI measurement based on a received CSI-RS, and feed back CSI of a downlink channel to the network device. Alternatively, the transmit end device may be a terminal device, and the receive end device may be a network device. The reference signal may be a reference signal used for uplink channel measurement, for example, a sounding reference signal (SRS). The network device may perform CSI measurement based on a received SRS, and indicate CSI of an uplink channel to the terminal device. The CSI may include, for example, a precoding matrix indicator (PMI), a rank indication (RI), and a channel quality indicator (CQI).

It should be understood that the enumerated reference signal used for downlink channel measurement and the enumerated reference signal used for uplink channel measurement are merely examples for description, and should not constitute any limitation on this application. For example, the reference signal used for downlink channel measurement may further be a downlink demodulation reference signal (DMRS), a tracking reference signal (TRS), or a phase tracking reference signal (PTRS). The reference signal used for uplink channel measurement may further be an uplink DMRS or the like. In addition, this application does not exclude a possibility of defining other reference signals that have a same or similar function in a future protocol, and this application does not exclude a possibility of defining another existing reference signal as a reference signal for channel measurement in a future protocol.

It should be further understood that a manner of determining the precoding matrix by the transmit end device is not limited to the foregoing manner of performing channel measurement based on the reference signal. The transmit end device may further estimate a channel based on reciprocity of an uplink channel and a downlink channel, for example, estimate CSI of a downlink channel based on channel state information (CSI) of an uplink channel. In this case, CSI of the uplink channel may be determined based on a reference signal (for example, an SRS) sent by the terminal device. A manner of determining the precoding matrix is not limited in this application.

To improve transmission flexibility of the terminal device to adapt to different scenarios, a plurality of transmission manners (or precoding manners) are currently proposed. The following briefly describes several transmission forms in an uplink transmission process of the terminal device in the embodiments of this application.

1. Coherent transmission: One layer-mapped signal stream may be precoded by using all configured transmit antenna ports, so as to form one spatial beam for sending. Spatial beams corresponding to different layer-mapped signal streams are different. This may be understood as beamforming, to reduce interference and improve signal quality.

2. Non-coherent transmission: One layer-mapped signal stream may be precoded and sent by using one transmit antenna port. Different layer-mapped signal streams use different transmit antenna ports, and time-frequency resources used when different transmit antenna ports are used to send the layer-mapped signal streams may be the same. This may be understood as antenna port selection, thereby improving resource utilization.

3. Partial coherent transmission: One layer-mapped signal stream may be precoded by using a part of configured transmit antenna ports, so as to form one spatial beam for sending. Transmit antenna ports used by at least two layer-mapped signal streams are different, or at least two layer-mapped signal streams are corresponding to different spatial beams. Because different signal streams are sent by using different spatial beams, the terminal device may communicate with different network devices by using a same time-frequency resource.

It can be learned that, the above-enumerated three transmission forms are mainly different in a precoding stage, and one layer-mapped signal stream is precoded separately by using different quantities of antennas. Therefore, the foregoing three transmission forms may also be referred to as precoding manners.

The above-enumerated three transmission forms may be applied to different scenarios, and different terminal devices have different capabilities of supporting transmission forms. Some terminal devices may support the foregoing three transmission forms, and some terminal devices may support only one or two of the foregoing three transmission forms. If a codebook does not support a plurality of transmission forms, transmission flexibility of the terminal device may be significantly limited.

In view of this, this application provides a communication method, so as to support the foregoing plurality of possible transmission forms and improve transmission flexibility.

The following describes in detail the embodiments of this application with reference to the accompanying drawings.

It should be understood that the technical solutions of this application may be applied to a wireless communications system, for example, the communications system 100 shown in FIG. 1. The communications system may include at least one network device and at least one terminal device, and the network device and the terminal device may communicate with each other by using a radio air interface. For example, the network device in the communications system may be corresponding to the network device 102 or the network device 104 shown in FIG. 1, and the terminal device may be corresponding to the terminal device 106 shown in FIG. 1.

It should be further understood that, in the embodiments shown in the following, first, second, third, fourth, fifth, sixth, and seventh are merely used for ease of distinguishing between different objects, and should not constitute any limitation on this application, for example, distinguishing between different indication information and different indication fields.

Without loss of generality, the following describes in detail the embodiments of this application by using an interaction process between one terminal device and a network device as an example. The terminal device may be any terminal device that is in a wireless communications system and that has a wireless connection relationship with the network device. It may be understood that the network device may communicate with a plurality of terminal devices that have a wireless connection relationship with the network device in the wireless communications system based on a same technical solution. This is not limited in this application.

Figure 2:
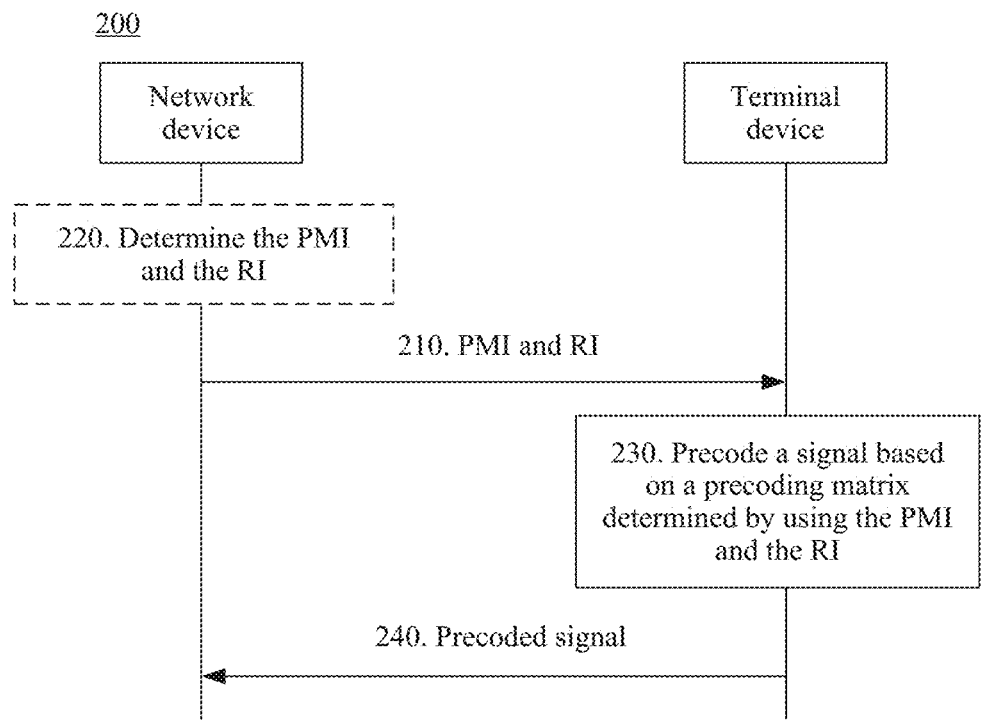
FIG. 2 is a schematic flowchart of a communication method according to an embodiment of this application.

FIG. 2 is a schematic flowchart of a communication method 200 according to an embodiment of this application from a perspective of device interaction. As shown in FIG. 2, the method 200 may include step 210 to step 240.

In step 210, a network device sends a PMI and an RI.

Correspondingly, in step 210, a terminal device receives the PMI and the RI.

Specifically, the PMI and the RI may be used to indicate a precoding matrix in a codebook. The RI may be used to indicate a rank, and the PMI may be used to indicate the precoding matrix in the codebook corresponding to the RI. In this embodiment of this application, the rank (for example, denoted as M) indicated by the RI may be an integer greater than 1. In other words, the codebook may be a higher-order codebook.

In this embodiment of this application, the PMI is a piece of possible indication information used to indicate a precoding matrix, and the PMI may also be referred to as a transmission PMI (TPMI). The RI is a piece of possible indication information used to indicate a rank. In some cases, the RI may also be referred to as a TRI (Transmission RI). It should be understood that the PMI, the RI, the TPMI, and the TRI are only specific forms used for indication information, and should not constitute any limitation on this application. This application does not exclude a possibility of defining other indication information in a future protocol to implement a same or similar function.

In addition, it should be further noted that the network device may send one or more PMIs to the terminal device, and a quantity of PMIs is not limited in this application. In the following, the quantity of PMIs sent by the network device to the terminal device and indicated information are described in detail with reference to a specific manner of indicating the precoding matrix.

Optionally, before step 210, the method further includes step 220: The network device determines the PMI and the RI.

In a possible implementation, the network device may determine the PMI and the RI based on a received reference signal (for example, an SRS). The network device may first estimate a channel matrix H based on the reference signal, and determine a rank of the channel matrix, that is, a quantity of columns of a precoding matrix, so that a codebook corresponding to the rank can be determined. The network device may further determine the precoding matrix from the codebook corresponding to the rank. It may be understood that precoding matrices included in the codebook corresponding to the rank may be understood as a set of candidate precoding matrices. The network device may determine, from the set of candidate precoding matrices, a precoding matrix (denoted as a target precoding matrix for ease of differentiation and description) that is adapted to a current channel. For example, the target precoding matrix is determined by using a degree of proximity between a candidate precoding matrix and an ideal precoding matrix as metrics. The ideal precoding matrix may be a preceding matrix calculated based on the channel matrix H.

For example, the network device may determine the target precoding matrix in a singular value decomposition (SVD) manner. Specifically, after measuring and obtaining the channel matrix H based on the reference signal, the network device may perform SVD on the channel matrix H to obtain:

$$H = U \cdot S \cdot V^H,$$

where U and $V^H$ are unitary matrices, S is a diagonal matrix, non-zero elements (namely, elements on a diagonal) of the diagonal matrix are singular values of the channel matrix H, and these singular values usually may be arranged in descending order. A conjugate transpose V of the right unitary matrix $V^H$ is the ideal precoding matrix. In other words, the ideal precoding matrix is a precoding matrix calculated based on the channel matrix H.

The network device may determine the degree of proximity between the candidate precoding matrix and the ideal precoding matrix, where the degree of proximity may be represented as, for example, but not limited to, a distance between the candidate precoding matrix and the ideal precoding matrix (for example, but not limited to a Euclidean distance). The network device may perform the foregoing process on each candidate precoding matrix, to obtain a degree of proximity between each candidate precoding matrix and the ideal precoding matrix. A candidate matrix with a highest degree of proximity may be selected as the target precoding matrix, and the target precoding matrix is the precoding matrix that is indicated by the network device to the terminal device by using the PMI and the RI.

It should be understood that a method for determining the ideal precoding matrix by performing SVD in the foregoing example is only one possible implementation, and should not constitute any limitation on this embodiment of this application. For example, the network device may further determine the ideal precoding matrix by using a receiver algorithm such as minimum mean square error (MMSE), zero-forcing (ZF), and maximum ratio combining (MRC). It should be further understood that a method for determining the target precoding matrix based on the Euclidean distance in the foregoing example is only one possible implementation, and should not constitute any limitation on this application. For example, the network device may further determine the target precoding matrix based on throughput maximization. SINR maximization, or another criterion, so as to determine the PMI.

It should be further understood that a specific method for determining the channel matrix by the network device based on the reference signal and determining the rank and the precoding matrix based on the channel matrix may be the same as that in the prior art. For brevity, detailed description of a specific process thereof is omitted herein. In addition, the network device may also determine the RI and the PMI based on a channel state, and indicate the RI and the PMI to the terminal device, and does not determine the RI and the PMI based on the reference signal. This is not limited in this application.

To support a more flexible transmission form, in this embodiment of this application, the foregoing codebook may include at least two types of a first-type precoding matrix, a second-type precoding matrix, and a third-type precoding matrix. In other words, the codebook may be classified into the first-type precoding matrix and the second-type precoding matrix by type, or may be classified into the second-type precoding matrix and the third-type precoding matrix by type, or may be classified into the first-type precoding matrix and the third-type precoding matrix by type, or may be classified into the first-type precoding matrix, the second-type precoding matrix, and the third-type precoding matrix by type. Each type of precoding matrix may be corresponding to one transmission form. In other words, the codebook may support at least two transmission forms.

Specifically, any matrix in the first-type precoding matrix may meet that: each column vector includes only one non-zero element, and non-zero elements in any two column vectors in each precoding matrix are located in different rows. The first-type precoding matrix may be used by the terminal device to perform non-coherent transmission.

Any matrix in the second-type precoding matrix may meet that: at least one column vector includes at least one zero element and at least two non-zero elements. The second-type precoding matrix may be used by the terminal device to perform partial coherent transmission.

Any matrix in the third-type precoding matrix may meet that each element is a non-zero element, and any two column vectors in a same matrix are orthogonal to each other. The third-type preceding matrix may be used by the terminal device to perform coherent transmission.

The following describes in detail the three types of precoding matrices proposed in this application with reference to specific precoding matrices.

It should be noted that, for ease of understanding only, several possible precoding matrices are shown for each type of preceding matrix in the following. However, this should not constitute any limitation on this application. The preceding matrix proposed in this application may meet at least one of the following enumerated preceding matrices. In other words, any matrix that meets at least one of the following enumerated preceding matrices should fall within the protection scope claimed by this application.

It should be further noted that, one or more possible preceding matrices are shown in the following for each type of precoding matrix. Some or all of the preceding matrices enumerated in the following for the three types of preceding matrices may be stored in the codebook, that is, the codebook may store some or all of any two types of the following enumerated three types of precoding matrices, or may store some or all of the three types of precoding matrices. This is not limited in this application.

It should be noted that "meeting at least one of the following" is not limited to "including at least one of the following", and may further include "being obtained through transformation from at least one of the following". Herein, "transformation" may include but is not limited to row and/or column transform, and/or normalization processing.

For example, if it is assumed that the precoding matrix meets $W_0$, a matrix that has a row and/or column transform relationship with $W_0$, a matrix obtained after normalization processing is performed on $W_0$, and a matrix obtained after row and/or column transform is performed on the matrix obtained after normalization processing is performed on $W_0$ should fall within a protection scope of "meeting $W_0$" in this application. That is, the precoding matrix in the codebook may include at least one of the following: $W_0$, or the matrix that has a row and/or column transform relationship with $W_0$, or the matrix obtained by performing normalization processing on $W_0$, or a matrix obtained by performing normalization processing on the matrix that has a row and/or column transform relationship with $W_0$.

In other words, $W_0$ may be understood as a possible structure (or a basic form) of the preceding matrix. A precoding matrix obtained by performing transformation such as normalization processing on a basis of this structure also falls within the disclosed scope of the precoding matrix provided in this embodiment of this application, and it may be understood that the precoding matrix meets an equation relationship of $W_0$. In specific description, the "structure" may be omitted. However, because transformation performed on the precoding matrix, such as normalization processing and/or row/column relationship transform has no substantial impact on application of the precoding matrix, a precoding matrix obtained through transformation such as normalization processing and/or row/column relationship transform on the precoding matrix in the following embodiments should also be understood as being within the disclosed scope of the precoding matrix provided in this embodiment of this application.

During normalization processing, a coefficient may be allocated to each element in the basic form, so that a sum of power corresponding to the elements is less than or equal to 1. Optionally, normalization processing includes but is not limited to multiplying the basic form by a constant coefficient, so as to adjust power of each layer, or power of each antenna port, or power of each stream. For example, normalization processing is performed on $W_0$ to obtain $$\frac{1}{\sqrt{M \cdot N}} W'_0.$$

M is a rank, and N is an antenna port quantity. Then, a matrix that has a row and/or column transform relationship with $W_0$ may include at least one of: a matrix that has a row and/or column transform relationship with $W_0$, or $$\frac{1}{\sqrt{M \cdot N}} W'_0,$$

or a matrix that has a row and/or column transform relationship with $$\frac{1}{\sqrt{M \cdot N}} W'_0 \cdot \frac{1}{\sqrt{M \cdot N}}$$

may be referred to as a normalization coefficient and may be used to adjust the power of each stream. The normalization coefficient may be a constant greater than 0.

It should be further noted that, in this embodiment of this application, if one precoding matrix includes a plurality of column vectors, it may be understood that one precoding matrix may be a matrix obtained by splicing the plurality of column vectors based on a pre-determined quantity of rows and a pre-determined quantity of columns, or may be a matrix obtained by performing row and/or column transform, based on a predetermined quantity of rows and a predetermined quantity of columns, on the matrix obtained by splicing the plurality of column vectors.

The following describes in detail the three types of precoding matrices proposed in this application with reference to specific precoding matrices.

1. First-Type Precoding Matrix (1) The rank is 2.

In a possible design, a structure of a precoding matrix with a rank of 2 (namely, the basic form of the precoding matrix described above) may meet:

$$U_1^{21} = \begin{bmatrix} 1 & 0 \\ 0 & 1 \\ 0 & 0 \\ 0 & 0 \end{bmatrix},$$

or a matrix that has a row and/or column transform relationship with $U_1^{21}$.

The subscript in $U_1^{21}$ represents the first-type precoding matrix, and the superscript represents a first structure of the precoding matrix with a rank of 2. Each column vector includes only one non-zero element, and non-zero elements in two column vectors are located in different rows.

By way of example and not limitation, the matrix that has a row and/or column transform relationship with $U_1^{21}$ may include:

$$\begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \text{ or } \begin{bmatrix} 0 & 0 \\ 0 & 0 \\ 1 & 0 \\ 0 & 1 \end{bmatrix}.$$

It should be understood that the above-enumerated matrices that have a row and/or column transform relationship with $U_1^{21}$ are merely examples for description, and should not constitute any limitation on this application. In the first-type precoding matrix, the structure of the precoding matrix with a rank of 2 may include at least one of the foregoing examples, or may include a matrix that has a row and/or column transform relationship with $U_1^{21}$ different from the foregoing examples.

Optionally, the precoding matrix with a rank of 2 meets at least one of the following:

$$W_1 = \frac{1}{2}\begin{bmatrix} 1 & 0 \\ 0 & 1 \\ 0 & 0 \\ 0 & 0 \end{bmatrix},$$

or a matrix that has a row and/or column transform relationship with $W_1$.

½ is a normalization coefficient, or is referred to as a constant coefficient. The precoding matrix is a matrix of four rows and two columns, that is, a four-antenna-port precoding matrix with a rank of 2. To meet power equalization between antenna ports, total transmit power may be evenly allocated to each antenna port, so that a requirement on a power amplifier of the terminal device can be reduced. Normalization processing means that ¼ of the total transmit power may be allocated to each of the four antenna ports. That is, ¼ of the power may be allocated to each row vector in the precoding matrix, and therefore a normalization coefficient $$\frac{1}{\sqrt{4}},$$

namely, ½ may be obtained. Therefore, $W_1$ and the matrix that has a row and/or column transform relationship with $W_1$ may be considered as precoding matrices that meet power equalization between antenna ports, and ½ may be considered as a normalization coefficient that meets power equalization between antenna ports.

By way of example and not limitation, the matrix that has a row and/or column transform relationship with $W_1$ may include:

$$\frac{1}{2}\begin{bmatrix} 1 & 0 \\ 0 & 0 \\ 0 & 1 \\ 0 & 0 \end{bmatrix}, \frac{1}{2}\begin{bmatrix} 1 & 0 \\ 0 & 0 \\ 0 & 0 \\ 0 & 1 \end{bmatrix}, \frac{1}{2}\begin{bmatrix} 0 & 0 \\ 1 & 0 \\ 0 & 1 \\ 0 & 0 \end{bmatrix}, \frac{1}{2}\begin{bmatrix} 0 & 0 \\ 1 & 0 \\ 0 & 0 \\ 0 & 1 \end{bmatrix}, \text{ or } \frac{1}{2}\begin{bmatrix} 0 & 0 \\ 0 & 0 \\ 1 & 0 \\ 0 & 1 \end{bmatrix}.$$

It should be understood that the above-enumerated $W_1$ and matrices that have a row and/or column transform relationship with $W_1$ are merely examples for description, and should not constitute any limitation on this application. In the first-type precoding matrix, the precoding matrix with a rank of 2 may include at least one of the foregoing examples, or may include a matrix that has a row and/or column transform relationship with $W_1$ different from the foregoing examples.

For ease of differentiation and description, the above-enumerated $W_1$ and matrices that have a row and/or column transform relationship with $W_1$ may be referred to as type A precoding matrices. It should be understood that the type A precoding matrix may be understood as a sub-type of the first-type precoding matrix, and the type A precoding matrix may be designed based on power equalization allocation between antenna ports.

Optionally, the precoding matrix with a rank of 2 meets at least one of the following:

$$W_2 = \frac{1}{\sqrt{2}} \begin{bmatrix} 1 & 0 \\ 0 & 1 \\ 0 & 0 \\ 0 & 0 \end{bmatrix},$$

or a matrix that has a row and/or column transform relationship with $W_2$.

$$\frac{1}{\sqrt{2}}$$

is a normalization coefficient. To meet power equalization between streams, total transmit power may be evenly allocated to each stream. Therefore, transmit power may be fully used to ensure signal quality. Normalization processing means that ¼ of the total transmit power may be allocated to each antenna port. However, because each column vector in the precoding matrix includes only one non-zero element, that is, each layer transmits a signal by using only one antenna port (namely, a row including a non-zero element), power allocated to another antenna port (namely, a row including no non-zero element) may be used by an antenna port having a transmit signal (namely, a row including a non-zero element). That is, power of each antenna port may be improved, and transmit power of each antenna port may be increased from ¼ to ½, and therefore a normalization coefficient $$\frac{1}{\sqrt{2}}$$

may be obtained. Therefore, $W_2$ and the matrix that has a row and/or column transform relationship with $W_2$ may be considered as precoding matrices that meet power equalization between streams (specifically, signal streams), and $$\frac{1}{\sqrt{2}}$$

may be considered as a normalization coefficient that meets power equalization between streams.

By way of example and not limitation, the matrix that has a row and/or column transform relationship with $W_2$ may include:

$$\frac{1}{\sqrt{2}} \begin{bmatrix} 1 & 0 \\ 0 & 0 \\ 0 & 1 \\ 0 & 0 \end{bmatrix}, \frac{1}{\sqrt{2}} \begin{bmatrix} 1 & 0 \\ 0 & 0 \\ 0 & 0 \\ 0 & 1 \end{bmatrix}, \frac{1}{\sqrt{2}} \begin{bmatrix} 0 & 0 \\ 1 & 0 \\ 0 & 1 \\ 0 & 0 \end{bmatrix}, \frac{1}{\sqrt{2}} \begin{bmatrix} 0 & 0 \\ 1 & 0 \\ 0 & 0 \\ 0 & 1 \end{bmatrix},$$

or $\frac{1}{\sqrt{2}} \begin{bmatrix} 0 & 0 \\ 0 & 0 \\ 1 & 0 \\ 0 & 1 \end{bmatrix}.$ It should be understood that the above-enumerated $W_2$ and matrices that have a row and/or column transform relationship with $W_2$ are merely examples for description, and should not constitute any limitation on this application. In the first-type precoding matrix, the precoding matrix with a rank of 2 may include at least one of the foregoing examples, or may include a matrix that has a row and/or column transform relationship with $W_2$ different from the foregoing examples.

For ease of differentiation and description, the above-enumerated $W_2$ and matrices that have a row and/or column transform relationship with $W_2$ may be referred to as type B precoding matrices. It should be understood that the type B precoding matrix may be understood as another sub-type of the first-type precoding matrix, and the type B precoding matrix may be designed based on power equalization allocation between signal streams.

It should be understood that the above-enumerated $W_1$ and matrices that have a row and/or column transform relationship with $W_1$, $W_2$ and matrices that have a row and/or column transform relationship with $W_2$ are merely examples for description, and should not constitute any limitation on this application. The precoding matrix with a rank of 2 may further include a matrix obtained by performing other normalization processing on $U_1^{21}$, or a matrix that has a row and/or column transform relationship with the matrix obtained by performing normalization processing on $U_1^{21}$.

In another possible design, the structure of the precoding matrix with a rank of 2 may meet:

$$U_1^{22} = \begin{bmatrix} \beta_1 & 0 \\ 0 & \beta_2 \\ 0 & 0 \\ 0 & 0 \end{bmatrix},$$

or a matrix that has a row and/or column transform relationship with $U_1^{21}$.

The subscript in $U_1^{21}$ represents the first-type precoding matrix, and the superscript represents a second structure of the precoding matrix with a rank of 2. Each column vector includes only one non-zero element, and non-zero elements in two column vectors are located in different rows. In this design, power allocated to each antenna port or each stream may be unbalanced.

Optionally, $\beta_1$ and $\beta_2$ meet $\beta_1^2 + \beta_2^2 \le 1$.

For example, a maximum value $\beta_{max}$ may be given, $\beta_{max} > 0$, $\beta_1 \in [0, \beta_{max}]$, and $\beta_2 \in [0, \beta_{max}]$.

It should be understood that values of $\beta_1$ and $\beta_2$ may be the same or may be different. This is not limited in this application.

By way of example and not limitation, the matrix that has a row and/or column transform relationship with $U_1^{22}$ may include:

$$\begin{bmatrix} \beta_1 & 0 \\ 0 & 0 \\ 0 & \beta_2 \\ 0 & 0 \end{bmatrix}, \begin{bmatrix} \beta_1 & 0 \\ 0 & 0 \\ 0 & 0 \\ 0 & \beta_2 \end{bmatrix}, \begin{bmatrix} 0 & 0 \\ \beta_1 & 0 \\ 0 & \beta_2 \\ 0 & 0 \end{bmatrix}, \begin{bmatrix} 0 & 0 \\ \beta_1 & 0 \\ 0 & 0 \\ 0 & \beta_2 \end{bmatrix}, \text{ or } \begin{bmatrix} 0 & 0 \\ 0 & 0 \\ \beta_1 & 0 \\ 0 & \beta_2 \end{bmatrix}.$$

Optionally, the precoding matrix with a rank of 2 may meet at least one of the following:

$$W_3 = \frac{1}{2}\begin{bmatrix} 1 & 0 \\ 0 & \gamma \\ 0 & 0 \\ 0 & 0 \end{bmatrix}, \text{ or } \frac{1}{2}\begin{bmatrix} 1 & 0 \\ 0 & 0 \\ 0 & \gamma \\ 0 & 0 \end{bmatrix}, \text{ or } \frac{1}{2}\begin{bmatrix} 1 & 0 \\ 0 & 0 \\ 0 & 0 \\ 0 & \gamma \end{bmatrix}, \text{ or } \frac{1}{2}\begin{bmatrix} 0 & 0 \\ 1 & 0 \\ 0 & \gamma \\ 0 & 0 \end{bmatrix},$$

$$\text{or } \frac{1}{2}\begin{bmatrix} 0 & 0 \\ 1 & 0 \\ 0 & 0 \\ 0 & \gamma \end{bmatrix}, \text{ or } \frac{1}{2}\begin{bmatrix} 0 & 0 \\ 0 & 0 \\ 1 & 0 \\ 0 & \gamma \end{bmatrix}.$$

This is equivalent to $\beta_1=\frac{1}{2}$ and $\beta_2=\frac{1}{2}\gamma$ in $U_1^{22}$ shown above, where $\gamma \in \{1, \sqrt{1/2}, \sqrt{1/4}, \sqrt{1/8}, \sqrt{1/16}\}$.

It should be understood that the above-enumerated precoding matrices are merely examples for description, and should not constitute any limitation on this application. In the first-type precoding matrix, the precoding matrix with a rank of 2 may include at least one of the foregoing examples, or may include a matrix that has a row and/or column transform relationship with any one of the foregoing examples and that is different from the foregoing examples.

In addition, the precoding matrix with a rank of 2 may further include a matrix obtained by performing other normalization processing on $U_1^{22}$, or a matrix that has a row and/or column transform relationship with the matrix obtained by performing normalization processing on $U_1^{22}$.

For ease of differentiation and description, the above-enumerated $W_3$ and matrices that have a row and/or column transform relationship with $W_3$ may be referred to as type C precoding matrices. It should be understood that the type C precoding matrix may be understood as still another subtype of the first-type precoding matrix.

(2) The rank is 3.

In a possible design, a structure of a precoding matrix with a rank of 3 may meet:

$$U_1^{31} = \begin{bmatrix} 1 & 0 & 0 \\ 0 & 1 & 0 \\ 0 & 0 & 1 \\ 0 & 0 & 0 \end{bmatrix},$$

or a matrix that has a row and/or column transform relationship with $U_1^{31}$.

The subscript in $U_1^{31}$ represents the first-type precoding matrix, and the superscript represents a first structure of the precoding matrix with a rank of 3. Each column vector includes only one non-zero element, and non-zero elements in two column vectors are located in different rows.

By way of example and not limitation, the matrix that has a row and/or column transform relationship with $U_1^{31}$ may include:

$$\begin{bmatrix} 1 & 0 & 0 \\ 0 & 1 & 0 \\ 0 & 0 & 0 \\ 0 & 0 & 1 \end{bmatrix}, \text{ or } \begin{bmatrix} 1 & 0 & 0 \\ 0 & 0 & 0 \\ 0 & 1 & 0 \\ 0 & 0 & 1 \end{bmatrix}, \text{ or } \begin{bmatrix} 0 & 0 & 0 \\ 1 & 0 & 0 \\ 0 & 1 & 0 \\ 0 & 0 & 1 \end{bmatrix}.$$

It should be understood that the above-enumerated matrices that have a row and/or column transform relationship with $U_1^{31}$ are merely examples for description, and should not constitute any limitation on this application. In the first-type precoding matrix, the structure of the precoding matrix with a rank of 3 may include at least one of the foregoing examples, or may include a matrix that has a row and/or column transform relationship with $U_1^{31}$ different from the foregoing examples.

Optionally, the precoding matrix with a rank of 3 meets at least one of the following:

$$W_4 = \frac{1}{2}\begin{bmatrix} 1 & 0 & 0 \\ 0 & 1 & 0 \\ 0 & 0 & 1 \\ 0 & 0 & 0 \end{bmatrix},$$

or a matrix that has a row and/or column transform relationship with $W_4$.

½ is a normalization coefficient. The precoding matrix is a matrix of four rows and three columns, that is, a four-antenna-port precoding matrix with a rank of 3. To meet power equalization between antenna ports, total transmit power may be evenly allocated to each antenna port. Normalization processing means that ¼ of the total transmit power may be allocated to each antenna port, and therefore a normalization coefficient ½ may be obtained. Therefore, $W_4$ and the matrix that has a row and/or column transform relationship with $W_4$ may be considered as precoding matrices that meet power equalization between antenna ports, and ½ may be considered as a normalization coefficient that meets power equalization between antenna ports.

By way of example and not limitation, the matrix that has a row and/or column transform relationship with $W_4$ may include:

$$\frac{1}{2}\begin{bmatrix} 1 & 0 & 0 \\ 0 & 1 & 0 \\ 0 & 0 & 0 \\ 0 & 0 & 1 \end{bmatrix}, \text{ or } \frac{1}{2}\begin{bmatrix} 1 & 0 & 0 \\ 0 & 0 & 0 \\ 0 & 1 & 0 \\ 0 & 0 & 1 \end{bmatrix}, \text{ or } \frac{1}{2}\begin{bmatrix} 0 & 0 & 0 \\ 1 & 0 & 0 \\ 0 & 1 & 0 \\ 0 & 0 & 1 \end{bmatrix}.$$

It should be understood that the above-enumerated $W_4$ and matrices that have a row and/or column transform relationship with $W_4$ are merely examples for description, and should not constitute any limitation on this application. The first-type precoding matrix may include at least one of the foregoing examples, or may include a matrix that has a row and/or column transform relationship with $W_4$ different from the foregoing examples.

For ease of understanding and description, the above-enumerated $W_4$ and matrices that have a row and/or column transform relationship with $W_4$ may be referred to as type A precoding matrices. It should be understood that the type A precoding matrix may be understood as a sub-type of the first-type precoding matrix. The type A precoding matrix may be designed based on power equalization allocation between antenna ports.

Optionally, the precoding matrix with a rank of 3 meets at least one of the following:

$$W_5 = \frac{1}{\sqrt{3}}\begin{bmatrix} 1 & 0 & 0 \\ 0 & 1 & 0 \\ 0 & 0 & 1 \\ 0 & 0 & 0 \end{bmatrix},$$

or a matrix that has a row and/or column transform relationship with $W_5$.

$$\frac{1}{\sqrt{3}}$$

is a normalization coefficient. To meet power equalization between streams, total transmit power may be evenly allocated to each stream. During normalization processing, it is assumed that total transmit power at each layer is 1, and ¼ of the power may be allocated to each antenna port. However, because each column vector in the precoding matrix includes only one non-zero element, that is, each layer transmits a signal by using only one antenna port (namely, a row including a non-zero element), power allocated to another antenna port (namely, a row including no non-zero element) may be used by an antenna port having a transmit signal (namely, a row including a non-zero element). That is, power of each antenna port may be improved, and transmit power of each antenna port may be increased from ¼ to ⅓, and therefore a normalization coefficient $$\frac{1}{\sqrt{3}}$$

may be obtained. Therefore, $W_5$ and the matrix that has a row and/or column transform relationship with $W_5$ may be considered as precoding matrices that meet power equalization between streams, and $$\frac{1}{\sqrt{3}}$$

may be considered as a normalization coefficient that meets power equalization between streams.

By way of example and not limitation, the matrix that has a row and/or column transform relationship with $W_5$ may include:

$$\frac{1}{\sqrt{3}}\begin{bmatrix} 1 & 0 & 0 \\ 0 & 1 & 0 \\ 0 & 0 & 0 \\ 0 & 0 & 1 \end{bmatrix}, \text{ or } \frac{1}{\sqrt{3}}\begin{bmatrix} 1 & 0 & 0 \\ 0 & 0 & 0 \\ 0 & 1 & 0 \\ 0 & 0 & 1 \end{bmatrix}, \text{ or } \frac{1}{\sqrt{3}}\begin{bmatrix} 0 & 0 & 0 \\ 1 & 0 & 0 \\ 0 & 1 & 0 \\ 0 & 0 & 1 \end{bmatrix}.$$

It should be understood that the above-enumerated $W_5$ and matrices that have a row and/or column transform relationship with $W_5$ are merely examples for description, and should not constitute any limitation on this application. The first-type precoding matrix may include at least one of the foregoing examples, or may include a matrix that has a row and/or column transform relationship with $W_5$ different from the foregoing examples.

For ease of differentiation and description, the above-enumerated $W_5$ and matrices that have a row and/or column transform relationship with $W_5$ may be referred to as type B precoding matrices. It should be understood that the type B precoding matrix may be understood as another sub-type of the first-type precoding matrix. The type B precoding matrix may be designed based on power equalization allocation between signal streams.

It should be understood that the above-enumerated $W_4$ and matrices that have a row and/or column transform relationship with $W_4$, $W_5$ and matrices that have a row and/or column transform relationship with $W_5$ are merely examples for description, and should not constitute any limitation on this application. In the first-type precoding matrix, the precoding matrix with a rank of 3 may further include a matrix obtained by performing other normalization processing on $U_1^{31}$, or a matrix that has a row and/or column transform relationship with the matrix obtained by performing normalization processing on $U_1^{31}$.

In another possible design, the structure of the precoding matrix with a rank of 3 may meet:

$$U_1^{32} = \begin{bmatrix} \beta_1 & 0 & 0 \\ 0 & \beta_2 & 0 \\ 0 & 0 & \beta_3 \\ 0 & 0 & 0 \end{bmatrix},$$

a matrix that has a row and/or column transform relationship with $U_1^{32}$.

The subscript in $U_1^{32}$ represents the first-type precoding matrix, and the superscript represents a second structure of the precoding matrix with a rank of 3. Each column vector includes only one non-zero element, and non-zero elements in two column vectors are located in different rows. Optionally, $\beta_1$, $\beta_2$, and $\beta_3$ meet $\beta_1^2+\beta_2^2+\beta_3^2 \leq 1$, where $\beta_1 \in [0, 1]$, $\beta_2 \in [0, 1]$, and $\beta_3 \in [0, 1]$. In this embodiment of this application, values of $\beta_1$, $\beta_2$, and $\beta_3$ may be defined in a protocol, and may be the same or different for different precoding matrices or different structures of precoding matrices. This is not limited in this application. In this design, power allocated to each antenna port or each stream may be unbalanced.

By way of example and not limitation, the matrix that has a row and/or column transform relationship with $U_1^{32}$ may include:

$$\begin{bmatrix} \beta_1 & 0 & 0 \\ 0 & \beta_2 & 0 \\ 0 & 0 & 0 \\ 0 & 0 & \beta_3 \end{bmatrix}, \begin{bmatrix} \beta_1 & 0 & 0 \\ 0 & 0 & 0 \\ 0 & \beta_2 & 0 \\ 0 & 0 & \beta_3 \end{bmatrix}, \text{ or } \begin{bmatrix} 0 & 0 & 0 \\ \beta_1 & 0 & 0 \\ 0 & \beta_2 & 0 \\ 0 & 0 & \beta_3 \end{bmatrix}.$$

It should be understood that the above-enumerated matrices that have a row and/or column transform relationship with $U_1^{32}$ are merely examples for description, and should not constitute any limitation on this application. In the first-type precoding matrix, the structure of the precoding matrix with a rank of 3 may include at least one of the foregoing examples, or may include a matrix that has a row and/or column transform relationship with $U_1^{32}$ different from the foregoing examples.

Optionally, the precoding matrix with a rank of 3 may meet at least one of the following:

$$W_6 = \frac{1}{2}\begin{bmatrix} 1 & 0 & 0 \\ 0 & \gamma_1 & 0 \\ 0 & 0 & \gamma_2 \\ 0 & 0 & 0 \end{bmatrix}, \text{ or } \frac{1}{2}\begin{bmatrix} 1 & 0 & 0 \\ 0 & \gamma_1 & 0 \\ 0 & 0 & 0 \\ 0 & 0 & \gamma_2 \end{bmatrix}, \text{ or }$$

$$\frac{1}{2}\begin{bmatrix} 1 & 0 & 0 \\ 0 & 0 & 0 \\ 0 & \gamma_1 & 0 \\ 0 & 0 & \gamma_2 \end{bmatrix}, \text{ or } \frac{1}{2}\begin{bmatrix} 0 & 0 & 0 \\ 1 & 0 & 0 \\ 0 & \gamma_1 & 0 \\ 0 & 0 & \gamma_2 \end{bmatrix}.$$

This is equivalent to $\beta_1=\frac{1}{2}$, $\beta_2=\frac{1}{2}\gamma_1$, and $\beta_3=\frac{1}{2}\gamma_2$, in $U_1^{32}$ shown above, where $\gamma_1 \in \{1, \sqrt{1/2}, \sqrt{1/4}, \sqrt{1/8}, \sqrt{1/16}\}$, and $\gamma_2 \in \{1, \sqrt{1/2}, \sqrt{1/4}, \sqrt{1/8}, \sqrt{1/16}\}$. In this embodiment of this application, $\gamma_1$ and $\gamma_2$ may be defined in a protocol, and values of $\gamma_1$ and $\gamma_2$ may be the same or different for different precoding matrices or different structures of precoding matrices. This is not limited in this application.

It should be understood that the above-enumerated precoding matrices are merely examples for description, and should not constitute any limitation on this application. In the first-type precoding matrix, the precoding matrix with a rank of 3 may include at least one of the foregoing examples, or may include a matrix that has a row and/or column transform relationship with any one of the foregoing examples and that is different from the foregoing examples.

In addition, the precoding matrix with a rank of 3 may further include a matrix obtained by performing other normalization processing on $U_1^{32}$, or a matrix that has a row and/or column transform relationship with the matrix obtained by performing normalization processing on $U_1^{32}$.

For ease of differentiation and description, the above-enumerated $W_6$ and matrices that have a row and/or column transform relationship with $W_6$ may be referred to as type C precoding matrices. It should be understood that the type C precoding matrix may be understood as still another sub-type of the first-type precoding matrix.

(3) The rank is 4.

In a possible design, a structure of a precoding matrix with a rank of 4 may meet:

$$U_1^4 = \begin{bmatrix} \beta_1 & 0 & 0 & 0 \\ 0 & \beta_2 & 0 & 0 \\ 0 & 0 & \beta_3 & 0 \\ 0 & 0 & 0 & \beta_4 \end{bmatrix},$$

or
a matrix that has a row and/or column transform relationship with $U_1^4$.

The subscript in $U_1^4$ represents the first-type precoding matrix, and the superscript represents a first structure of the precoding matrix with a rank of 3. Each column vector includes only one non-zero element, and non-zero elements in two column vectors are located in different rows. Optionally, $\beta_1$, $\beta_2$, $\beta_3$, and $\beta_4$ meet $\beta_1^2+\beta_2^2+\beta_3^2+\beta_4^2 \le 1$, where $\beta_1 \in [0, 1]$, $\beta_2 \in [0, 1]$, $\beta_3 \in [0, 1]$, and $\beta_4 \in [0, 1]$. In this embodiment of this application, values of $\beta_1$, $\beta_2$, $\beta_3$, and $\beta_4$ may be defined in a protocol, and may be the same or different for different precoding matrices or different structures of precoding matrices. This is not limited in this application. In this design, power allocated to each antenna port or each stream may be unbalanced.

Optionally, the precoding matrix with a rank of 4 may meet at least one of the following:

$$W_7 = \frac{1}{2}\begin{bmatrix} 1 & 0 & 0 & 0 \\ 0 & \gamma_1 & 0 & 0 \\ 0 & 0 & \gamma_2 & 0 \\ 0 & 0 & 0 & \gamma_3 \end{bmatrix},$$

or
a matrix that has a row and/or column transform relationship with $W_7$.

This is equivalent to $\beta_1=\sqrt{1/2}$, $\beta_2=\sqrt{1/2}\gamma_1$, $\beta_3=\sqrt{1/2}\gamma_2$, and $\beta_4=\sqrt{1/2}\gamma_3$, in $U_1^{32}$ shown above, where $\gamma_1 \in \{1, \sqrt{1/2}, \sqrt{1/4}, \sqrt{1/8}, \sqrt{1/16}\}$, $\gamma_2 \in \{1, \sqrt{1/2}, \sqrt{1/4}, \sqrt{1/8}, \sqrt{1/16}\}$, and $\gamma_3 \in \{1, \sqrt{1/2}, \sqrt{1/4}, \sqrt{1/8}, \sqrt{1/16}\}$. In this embodiment of this application, $\gamma_1$, $\gamma_2$, and $\gamma_3$ may be defined in a protocol, and values of $\gamma_1$, $\gamma_2$, and $\gamma_3$ may be the same or different for different precoding matrices or different structures of precoding matrices. This is not limited in this application.

It should be understood that the above-enumerated precoding matrices are merely examples for description, and should not constitute any limitation on this application. In the first-type precoding matrix, the precoding matrix with a rank of 4 may include at least one of the foregoing examples, or may include a matrix that has a row and/or column transform relationship with any one of the foregoing examples different from the foregoing examples.

In addition, the precoding matrix with a rank of 4 may further include a matrix obtained by performing other normalization processing on $U_1^4$, or a matrix that has a row and/or column transform relationship with the matrix obtained by performing normalization processing on $U_1^4$.

It should be noted that, in a current protocol, for example, in an LTE protocol, some precoding matrices in a codebook with a rank of 4 may support non-coherent transmission. Therefore, first-type precoding matrices in the codebook with a rank of 4 may include some or all of precoding matrices in the codebook with a rank of 4 in the LTE protocol, or may include some or all of precoding matrices with a rank of 4 proposed in this application, or may include some or all of a combination of the foregoing two. This is not limited in this application.

In addition, in the current protocol, for example, in the LTE protocol, a codebook with a rank of 1 may support non-coherent transmission. Therefore, first-type precoding matrices in the codebook with a rank of 1 may include some or all of precoding matrices in the codebook with a rank of 1 in the LTE protocol. For brevity, examples are not enumerated herein one by one.

Based on the foregoing design, the codebook may support four-antenna-port non-coherent transmission with any quantity of layers within a range of [1, 4], which greatly improves transmission flexibility. In addition, different requirements such as power equalization between antenna ports or power equalization between streams may be met. In addition, based on non-coherent transmission, on a same time-frequency resource, a same terminal device may send different signal streams on different antenna ports, or send signals to different network devices on different antenna ports, thereby improving resource utilization.

It should be noted that type A, type B, and type C enumerated above may be understood as sub-types of the first-type precoding matrix, and type A, type B, and type C may be separately designed based on different power allocation manners. In addition, for different ranks, one or more possible precoding matrices of type A, type B, and type C are separately enumerated above. At least one of type A, type B, and type C may be stored in the codebook, and higher layer signaling is used to indicate a type of an available precoding matrix.

2. Second-Type Precoding Matrix (1) The Rank is 3.

In a possible design, a structure $U_2^3$ of a precoding matrix with a rank of 3 may meet:

$$U_2^3 = \begin{bmatrix} 1 & 0 & 1 \\ 0 & 1 & 0 \\ \varphi_1 & 0 & -\varphi_1 \\ 0 & \varphi_2 & 0 \end{bmatrix},$$

or a matrix that has a row and/or column transform relationship with $$\begin{bmatrix} 1 & 0 & 1 \\ 0 & 1 & 0 \\ \varphi_1 & 0 & -\varphi_1 \\ 0 & \varphi_2 & 0 \end{bmatrix}, \text{ or } U_2^3 = \begin{bmatrix} 1 & 0 & 1 \\ 0 & 1 & 0 \\ \varphi_1 & 0 & -\varphi_1 \\ 0 & -\varphi_2 & 0 \end{bmatrix},$$

or a matrix that has a row and/or column transform relationship with $$\begin{bmatrix} 1 & 0 & 1 \\ 0 & 1 & 0 \\ \varphi_1 & 0 & -\varphi_1 \\ 0 & -\varphi_2 & 0 \end{bmatrix}, \text{ or } U_2^3 = \begin{bmatrix} 0 & 1 & 0 \\ 1 & 0 & 1 \\ 0 & \varphi_1 & 0 \\ \varphi_2 & 0 & -\varphi_2 \end{bmatrix},$$

or a matrix that has a row and/or column transform relationship with $$\begin{bmatrix} 0 & 1 & 0 \\ 1 & 0 & 1 \\ 0 & \varphi_1 & 0 \\ \varphi_2 & 0 & -\varphi_2 \end{bmatrix}, \text{ or } U_2^3 = \begin{bmatrix} 0 & 1 & 0 \\ 1 & 0 & 1 \\ 0 & -\varphi_1 & 0 \\ \varphi_2 & 0 & -\varphi_2 \end{bmatrix},$$

or a matrix that has a row and/or column transform relationship with $$\begin{bmatrix} 0 & 1 & 0 \\ 1 & 0 & 1 \\ 0 & -\varphi_1 & 0 \\ \varphi_2 & 0 & -\varphi_2 \end{bmatrix}.$$

The subscript in $U_2^3$ represents the second-type precoding matrix, and the superscript represents a rank of 3. Each column vector includes only at least two non-zero elements and at least one zero element.

Optionally, $\varphi_1 \in \{1, -1, j, -j\}$, $\varphi_2 \in \{1, -1, j, -j\}$, and j is an imaginary unit.

Optionally, $\varphi_1 \in \{1, \sqrt{1/2}, \sqrt{1/4}, \sqrt{1/8}, \sqrt{1/16}\}$, $\varphi_2 \in \{1, \sqrt{1/2}, \sqrt{1/4}, \sqrt{1/8}, \sqrt{1/16}\}$.

It should be noted that, in this application, two possible value ranges of $\varphi_1$ and $\varphi_2$ are provided in this application, and values of $\varphi_1$ and $\varphi_2$ may be any one of the examples. However, it should be noted that regardless of which value range of $\varphi_1$ and $\varphi_2$ is used, it does not mean that the values of $\varphi_1$ and $\varphi_2$ need to traverse the entire value ranges provided above. $\varphi_1 \in \{1, -1, j, -j\}$ is used as an example, $\varphi_1 \in \{1, -1, j, -j\}$ may be understood as $\varphi_1 \in A$, and A is $\{1, -1, j, -j\}$ or a subset of $\{1, -1, j, -j\}$. That is, $\varphi_1$ may meet $\varphi_1 \in \{1, -1\}$, or $\varphi_1 \in \{j, -j\}$, or $\varphi_1 \in \{1, j\}$, or $\varphi_1 \in \{-1, -j\}$, or the like. For brevity, examples are not enumerated herein one by one. Similarly, for a value of $\varphi_2$, refer to the foregoing related description. For brevity, a same or similar case is not described below.

In this embodiment of this application, the values of $\varphi_1$ and $\varphi_2$ may be defined in a protocol, and may be the same or different for different precoding matrices or different structures of precoding matrices. This is not limited in this application.

To support partial coherent transmission, it needs to be ensured that at least two antenna ports may perform coherent transmission, and there are at least two groups of antenna ports that are non-coherent. In other words, it is ensured that each group includes at least two antenna ports, antenna ports in each group may perform coherent transmission, and antenna ports in different groups are independent of each other. Therefore, antenna ports may be grouped into at least two groups, and each group includes at least two antenna ports. For four antenna ports, the antenna ports may be grouped according to port numbers to obtain, for example, $\{1, 3\}$ and $\{2, 4\}$, or $\{1, 2\}$ and $\{3, 4\}$, or $\{1, 4\}$ and $\{2, 3\}$.

If a row number of each row in the precoding matrix is corresponding to a port number of an antenna port, $U_2^3$ shows an example of grouping based on the port numbers $\{1, 3\}$ and $\{2, 4\}$. It may be understood that antenna ports in a same group are corresponding to a same layer, that is, antenna ports whose non-zero elements are located in a same column vector are in one group. As shown in $U_2^3$, non-zero elements in the first row and the third row are located in both the first column and the third column, and it may be considered that they belong to one group of antenna ports (for example, denoted as an antenna port group #1), and non-zero elements in the second row and the fourth row are located in the second column, and it may be considered that they belong to another group of antenna ports (for example, denoted as an antenna port group #2).

It is assumed that $\varphi_1 = \varphi_2$, $\varphi_1$ and $\varphi_2 \in \{1, -1, j, -j\}$ are separately substituted, and $U_2^3$ and the matrix that has a row and/or column transform relationship with $U_2^3$ may include:

$$\varphi_1 = \varphi_2 = 1, \begin{bmatrix} 1 & 0 & 1 \\ 0 & 1 & 0 \\ 1 & 0 & -1 \\ 0 & 1 & 0 \end{bmatrix}, \begin{bmatrix} 1 & 0 & 1 \\ 0 & 1 & 0 \\ 1 & 0 & -1 \\ 0 & -1 & 0 \end{bmatrix}, \begin{bmatrix} 0 & 1 & 0 \\ 1 & 0 & 1 \\ 0 & 1 & 0 \\ 1 & 0 & -1 \end{bmatrix}, \begin{bmatrix} 0 & 1 & 0 \\ 1 & 0 & 1 \\ 0 & -1 & 0 \\ 1 & 0 & -1 \end{bmatrix};$$

$$\varphi_1 = \varphi_2 = -1, \begin{bmatrix} 1 & 0 & 1 \\ 0 & 1 & 0 \\ -1 & 0 & 1 \\ 0 & -1 & 0 \end{bmatrix}, \begin{bmatrix} 1 & 0 & 1 \\ 0 & 1 & 0 \\ -1 & 0 & 1 \\ 0 & 1 & 0 \end{bmatrix}, \begin{bmatrix} 0 & 1 & 0 \\ 1 & 0 & 1 \\ 0 & -1 & 0 \\ -1 & 0 & 1 \end{bmatrix}, \begin{bmatrix} 0 & 1 & 0 \\ 1 & 0 & 1 \\ 0 & 1 & 0 \\ -1 & 0 & 1 \end{bmatrix};$$

$$\varphi_1 = \varphi_2 = j, \begin{bmatrix} 1 & 0 & 1 \\ 0 & 1 & 0 \\ j & 0 & -j \\ 0 & j & 0 \end{bmatrix}, \begin{bmatrix} 1 & 0 & 1 \\ 0 & 1 & 0 \\ j & 0 & -j \\ 0 & -j & 0 \end{bmatrix}, \begin{bmatrix} 0 & 1 & 0 \\ 1 & 0 & 1 \\ 0 & j & 0 \\ j & 0 & -j \end{bmatrix}, \begin{bmatrix} 0 & 1 & 0 \\ 1 & 0 & 1 \\ 0 & -j & 0 \\ j & 0 & -j \end{bmatrix};$$

$$\varphi_1 = \varphi_2 = -j, \begin{bmatrix} 1 & 0 & 1 \\ 0 & 1 & 0 \\ -j & 0 & j \\ 0 & -j & 0 \end{bmatrix}, \begin{bmatrix} 1 & 0 & 1 \\ 0 & 1 & 0 \\ -j & 0 & j \\ 0 & j & 0 \end{bmatrix}, \begin{bmatrix} 0 & 1 & 0 \\ 1 & 0 & 1 \\ 0 & -j & 0 \\ -j & 0 & j \end{bmatrix}, \text{ or } \begin{bmatrix} 0 & 1 & 0 \\ 1 & 0 & 1 \\ 0 & j & 0 \\ -j & 0 & j \end{bmatrix}.$$

It should be understood that the above-enumerated matrices that have a row and/or column transform relationship with $U_2^3$ are merely examples for description, and should not constitute any limitation on this application. In the second-type precoding matrix, the structure of the precoding matrix with a rank of 3 may include at least one of the foregoing examples, or may include a matrix that has a row and/or column transform relationship with $U_2^3$ different from the foregoing examples.

Optionally, the structure $U_2^3$ of the precoding matrix with a rank of 3 meets at least one of the following:

$$U_2^3 = \begin{bmatrix} 0 & 1 & 0 \\ 1 & 0 & 1 \\ 0 & \varphi_2 & 0 \\ \varphi_1 & 0 & -\varphi_1 \end{bmatrix},$$

or a matrix that has a row and/or column transform relationship with $$\begin{bmatrix} 0 & 1 & 0 \\ 1 & 0 & 1 \\ 0 & \varphi_2 & 0 \\ \varphi_1 & 0 & -\varphi_1 \end{bmatrix},$$

or $$U_2^3 = \begin{bmatrix} 1 & 1 & 0 \\ 0 & 0 & 1 \\ \varphi_1 & -\varphi_1 & 0 \\ 0 & 0 & \varphi_2 \end{bmatrix},$$

or a matrix that has a row and/or column transform relationship with $$\begin{bmatrix} 1 & 1 & 0 \\ 0 & 0 & 1 \\ \varphi_1 & -\varphi_1 & 0 \\ 0 & 0 & \varphi_2 \end{bmatrix}, \text{ or }$$

$$U_2^3 = \begin{bmatrix} 1 & 0 & 0 \\ 0 & 1 & 1 \\ \varphi_2 & 0 & 0 \\ 0 & \varphi_1 & -\varphi_1 \end{bmatrix},$$

or or a matrix that has a row and/or column transform relationship with $$\begin{bmatrix} 1 & 0 & 0 \\ 0 & 1 & 1 \\ \varphi_2 & 0 & 0 \\ 0 & \varphi_1 & -\varphi_1 \end{bmatrix}.$$

Optionally, $\varphi_1 \in \{1, -1, j, -j\}$, $\varphi_2 \in \{1, -1, j, -j\}$, and j is an imaginary unit.

Optionally, $\varphi_1 \in \{1, \sqrt{1/2}, \sqrt{1/4}, \sqrt{1/8}, \sqrt{1/16}\}$, $\varphi_2 \in \{1, \sqrt{1/2}, \sqrt{1/4}, \sqrt{1/8}, \sqrt{1/16}\}$.

In this embodiment of this application, values of $\varphi_1$ and $\varphi_2$ may be defined in a protocol, and may be the same or different for different precoding matrices or different structures of precoding matrices. This is not limited in this application.

Optionally, the structure $U_2^3$ of the precoding matrix with a rank of 3 includes at least one of the following:

$$U_2^3 = \frac{1}{2}\begin{bmatrix} 1 & 0 & 0 \\ \theta_1 & 0 & 0 \\ 0 & \theta_2 & 0 \\ 0 & 0 & \theta_3 \end{bmatrix},$$

or a matrix that has a row and/or column transform relationship with $$\frac{1}{2}\begin{bmatrix} 1 & 0 & 0 \\ \theta_1 & 0 & 0 \\ 0 & \theta_2 & 0 \\ 0 & 0 & \theta_3 \end{bmatrix}, \text{ or }$$

$$\frac{1}{2}\begin{bmatrix} 1 & 0 & 0 \\ 0 & \theta_2 & 0 \\ \theta_1 & 0 & 0 \\ 0 & 0 & \theta_3 \end{bmatrix},$$

or a matrix that has a row and/or column transform relationship with $$\frac{1}{2}\begin{bmatrix} 1 & 0 & 0 \\ 0 & \theta_2 & 0 \\ \theta_1 & 0 & 0 \\ 0 & 0 & \theta_3 \end{bmatrix}, \text{ or }$$

$$\frac{1}{2}\begin{bmatrix} 1 & 0 & 0 \\ 0 & \theta_2 & 0 \\ 0 & 0 & \theta_3 \\ \theta_1 & 0 & 0 \end{bmatrix},$$

or a matrix that has a row and/or column transform relationship with $$\frac{1}{2}\begin{bmatrix} 1 & 0 & 0 \\ 0 & \theta_2 & 0 \\ 0 & 0 & \theta_3 \\ \theta_1 & 0 & 0 \end{bmatrix}, \text{ or}$$

$$\frac{1}{2}\begin{bmatrix} 0 & \theta_2 & 0 \\ 1 & 0 & 0 \\ \theta_1 & 0 & 0 \\ 0 & 0 & \theta_3 \end{bmatrix},$$

or a matrix that has a row and/or column transform relationship with $$\frac{1}{2}\begin{bmatrix} 0 & \theta_2 & 0 \\ 1 & 0 & 0 \\ \theta_1 & 0 & 0 \\ 0 & 0 & \theta_3 \end{bmatrix}, \text{ or}$$

$$\frac{1}{2}\begin{bmatrix} 0 & \theta_2 & 0 \\ 1 & 0 & 0 \\ 0 & 0 & \theta_3 \\ \theta_1 & 0 & 0 \end{bmatrix},$$

or a matrix that has a row and/or column transform relationship with $$\frac{1}{2}\begin{bmatrix} 0 & \theta_2 & 0 \\ 1 & 0 & 0 \\ 0 & 0 & \theta_3 \\ \theta_1 & 0 & 0 \end{bmatrix}, \text{ or}$$

$$\frac{1}{2}\begin{bmatrix} 0 & \theta_2 & 0 \\ 0 & 0 & \theta_3 \\ 1 & 0 & 0 \\ \theta_1 & 0 & 0 \end{bmatrix},$$

or a matrix that has a row and/or column transform relationship with $$\frac{1}{2}\begin{bmatrix} 0 & \theta_2 & 0 \\ 0 & 0 & \theta_3 \\ 1 & 0 & 0 \\ \theta_1 & 0 & 0 \end{bmatrix}.$$

$\theta_1 \in \{1, \sqrt{1/2}, \sqrt{1/4}, \sqrt{1/8}, \sqrt{1/16}\}$, $\theta_2 \in \{1, \sqrt{1/2}, \sqrt{1/4}, \sqrt{1/8}, \sqrt{1/16}\}$, and $\theta_3 \in \{1, \sqrt{1/2}, \sqrt{1/4}, \sqrt{1/8}, \sqrt{1/16}\}$. In this embodiment of this application, values of $\theta_1$ and $\theta_2$ may be defined in a protocol, and may be the same or different for different precoding matrices or different structures of precoding matrices. This is not limited in this application.

Optionally, the precoding matrix with a rank of 3 meets at least one of the following:

$$W_8 = \frac{1}{\sqrt{6}}\begin{bmatrix} 1 & 0 & 1 \\ 0 & 1 & 0 \\ \varphi_1 & 0 & -\varphi_1 \\ 0 & \varphi_2 & 0 \end{bmatrix},$$

or
a matrix that has a row and/or column transform relationship with $W_8$.

It may be further learned from U that, the antenna port group #1 may be used to send signals of two layers, that is, two streams, and the antenna port group #2 may be used to send a signal of one layer, that is, one stream. To ensure power equalization between different streams, a normalization coefficient may be obtained through normalization processing. It is assumed that total transmit power is 1, and ⅓ of the power may be allocated to each of the three layers. That is, ⅓ of the power may be allocated to each row vector in the precoding matrix. Because coherent transmission may be performed on a signal stream of each layer through two antenna ports, ⅙ of the power may be further allocated to each of two antenna ports corresponding to each layer, and a normalization coefficient $$\frac{1}{\sqrt{6}}$$

may be obtained. Therefore, $W_8$ and the matrix that has a row and/or column transform relationship with $W_8$ may be considered as precoding matrices that meet power equalization between streams, and $$\frac{1}{\sqrt{6}}$$

may be considered as a normalization coefficient that meets power equalization between streams.

By way of example and not limitation, the matrix that has a row and/or column transform relationship with $W_8$ may include:

$$\frac{1}{\sqrt{6}}\begin{bmatrix} 1 & 0 & 1 \\ 0 & 1 & 0 \\ \varphi_1 & 0 & -\varphi_1 \\ 0 & -\varphi_2 & 0 \end{bmatrix}, \frac{1}{\sqrt{6}}\begin{bmatrix} 0 & 1 & 0 \\ 1 & 0 & 1 \\ 0 & \varphi_1 & 0 \\ \varphi_2 & 0 & -\varphi_2 \end{bmatrix}, \text{ or}$$

$$\frac{1}{\sqrt{6}}\begin{bmatrix} 0 & 1 & 0 \\ 1 & 0 & 1 \\ 0 & -\varphi_1 & 0 \\ \varphi_2 & 0 & -\varphi_2 \end{bmatrix}.$$

It should be understood that the above-enumerated $W_8$ and matrices that have a row and/or column transform relationship with $W_8$ are merely examples for description, and should not constitute any limitation on this application. The second-type precoding matrix may include at least one of the foregoing examples, or may include a matrix that has a row and/or column transform relationship with $W_8$ different from the foregoing examples.

Optionally, the precoding matrix with a rank of 3 meets at least one of the following:

$$W_9 = \begin{bmatrix} 1 & 0 & 1 \\ 0 & 1 & 0 \\ \varphi_1 & 0 & -\varphi_1 \\ 0 & \varphi_2 & 0 \end{bmatrix} H_1,$$

or a matrix that has a row and/or column transform relationship with $W_9$.

$H_1$ is a coefficient matrix, or $H_1$ is a normalization coefficient matrix, that is, a matrix including normalization coefficients, and may be used to adjust power of each antenna port or stream.

Optionally, $$H_1 = \begin{bmatrix} \frac{1}{\sqrt{8}} & 0 & 0 \\ 0 & \frac{1}{4} & 0 \\ 0 & 0 & \frac{1}{\sqrt{8}} \end{bmatrix} \text{ or } H_1 = \begin{bmatrix} \frac{1}{\sqrt{8}} \\ \frac{1}{4} \\ \frac{1}{\sqrt{8}} \end{bmatrix}.$$

To equalize power of each antenna port in a same antenna port group, power allocated to each antenna port may be adjusted by using the normalization coefficient matrix. For example, after a square of each coefficient in $H_1$ is substituted into the foregoing formula, an obtained sum of power of all antenna ports is less than 1, and power allocated to antenna ports in each antenna port group is the same.

Optionally, the precoding matrix with a rank of 3 meets at least one of the following:

$$W_{10} = H_2 \begin{bmatrix} 1 & 0 & 1 \\ 0 & 1 & 0 \\ \varphi_1 & 0 & -\varphi_1 \\ 0 & \varphi_2 & 0 \end{bmatrix},$$

a matrix that has a row and/or column transform relationship with $W_{10}$.

$H_2$ is a coefficient matrix, or $H_2$ is a normalization coefficient matrix, that is, a matrix including normalization coefficients, and may be used to adjust power of each antenna port or stream.

Optionally, $$H_2 = \begin{bmatrix} \frac{1}{\sqrt{8}} & 0 & 0 & 0 \\ 0 & \frac{1}{4} & 0 & 0 \\ 0 & 0 & \frac{1}{\sqrt{8}} & 0 \\ 0 & 0 & 0 & \frac{1}{4} \end{bmatrix} \text{ or } H_2 = \begin{bmatrix} \frac{1}{\sqrt{8}} & \frac{1}{4} & \frac{1}{\sqrt{8}} & \frac{1}{4} \end{bmatrix}.$$

To equalize power of each antenna port in a same antenna port group, power allocated to each antenna port may be adjusted by using the normalization coefficient matrix. For example, after a square of each coefficient in $H_2$ is substituted into the foregoing formula, an obtained sum of power of all antenna ports is less than 1, and power allocated to antenna ports in each antenna port group is the same.

It should be understood that the above-enumerated precoding matrices with a rank of 3 are merely examples for description, and should not constitute any limitation on this application. In the second-type precoding matrix, the precoding matrix with a rank of 3 may include a matrix obtained after the structure $U_2^3$ of the precoding matrix with a rank of 3 is transformed (such as normalization processing and/or row and/or column transform), or a matrix that is different from the foregoing examples and obtained after a matrix that has a row and/or column transform relationship with any one of the structure $U_2^3$ of the precoding matrix with a rank of 3 is transformed.

(2) The rank is 4.

In a possible design, a structure $U_2^4$ of a precoding matrix with a rank of 4 may meet:

$$U_2^4 = \begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix},$$

or a matrix that has a row and/or column transform relationship with $$\begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix}, \text{ or } U_2^4 = \begin{bmatrix} 1 & 1 & 0 & 0 \\ 0 & 0 & 1 & 1 \\ \varphi_1 & -\varphi_1 & 0 & 0 \\ 0 & 0 & \varphi_2 & -\varphi_2 \end{bmatrix},$$

or a matrix that has a row and/or column transform relationship with $$\begin{bmatrix} 1 & 1 & 0 & 0 \\ 0 & 0 & 1 & 1 \\ \varphi_1 & -\varphi_1 & 0 & 0 \\ 0 & 0 & \varphi_2 & -\varphi_2 \end{bmatrix}.$$

The subscript in $U_2^4$ represents the second-type precoding matrix, and the superscript represents a rank of 4. Each column vector includes only at least two non-zero elements and at least one zero element.

Optionally, $\varphi_1 \in \{1, -1, j, -j\}$, $\varphi_2 \in \{1, -1, j, -j\}$, and j is an imaginary unit.

Optionally, $\varphi_1 \in \{1, \sqrt{1/2}, \sqrt{1/4}, \sqrt{1/8}, \sqrt{1/16}\}$, $\varphi_2 \in \{1, \sqrt{1/2}, \sqrt{1/4}, \sqrt{1/8}, \sqrt{1/16}\}$.

In this embodiment of this application, values of $\varphi_1$ and $\varphi_2$ may be defined in a protocol, and may be the same or different for different precoding matrices or different structures of precoding matrices. This is not limited in this application.

If a row number of each row in the precoding matrix is corresponding to a port number of an antenna port, $U_2^4$ shows an example of grouping based on port numbers $\{1, 3\}$ and $\{2, 4\}$. It may be understood that antenna ports in a same group are corresponding to a same layer, that is, antenna ports whose non-zero elements are located in a same column vector are in one group. As shown in $U_2^4$, non-zero elements in the first row and the third row are located in both the first column and the third column, and it may be considered that they belong to one group of antenna ports (for example, denoted as an antenna port group #3); and non-zero elements in the second row and the fourth row are located in the second column, and it may be considered that they belong to another group of antenna ports (for example, denoted as an antenna port group #4).

It is assumed that $\varphi_1=\varphi_2$, values $\{1, -1, j, -j\}$ of $\varphi_1$ and $\varphi_2$ are separately substituted to obtain $U_2^4$ that may include:

$$\begin{bmatrix} 1 & 0 & 1 & 0 \\ 0 & 1 & 0 & 1 \\ 1 & 0 & -1 & 0 \\ 0 & 1 & 0 & -1 \end{bmatrix}, \begin{bmatrix} 1 & 0 & 1 & 0 \\ 0 & 1 & 0 & 1 \\ -1 & 0 & 1 & 0 \\ 0 & -1 & 0 & 1 \end{bmatrix},$$

$$\begin{bmatrix} 1 & 0 & 1 & 0 \\ 0 & 1 & 0 & 1 \\ j & 0 & -j & 0 \\ 0 & j & 0 & -j \end{bmatrix}, \text{and} \begin{bmatrix} 1 & 0 & 1 & 0 \\ 0 & 1 & 0 & 1 \\ -j & 0 & j & 0 \\ 0 & -j & 0 & j \end{bmatrix}.$$

It should be understood that the above-enumerated structures of the precoding matrices with a rank of 4 are merely examples for description, and should not constitute any limitation on this application. In the second-type precoding matrix, the structure of the preceding matrix with a rank of 4 may include at least one of the foregoing examples, or may include a matrix that has a row and/or column transform relationship with $U_2^4$ different from the foregoing examples.

Optionally, the precoding matrix with a rank of 4 meets at least one of the following:
or $$W_{11} = \frac{1}{\sqrt{8}} \begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix},$$

a matrix that has a row and/or column transform relationship with $W_{11}$.

It may be further learned from $U_2^4$ that, the antenna port group #3 may be used to send signals of two layers, that is, two streams, and the antenna port group #4 may be used to send signals of two layers, that is, two streams. To ensure power equalization between different streams, a normalization coefficient may be obtained through normalization processing. It is assumed that total transmit power is 1, and ¼ of the power may be allocated to each of the four layers. That is, ¼ of the power may be allocated to each row vector in the precoding matrix. Because coherent transmission may be performed on a signal stream of each layer through two antenna ports, ⅛ of the power may be further allocated to two antenna ports corresponding to each layer, and a normalization coefficient $$\frac{1}{\sqrt{8}}$$

may be obtained. Therefore, $W_{11}$ and the matrix that has a row and/or column transform relationship with $W_{11}$ may be considered as precoding matrices that meet power equalization between streams, and $$\frac{1}{\sqrt{8}}$$

may be considered as a normalization coefficient that meets power equalization between streams.

Based on the foregoing design, the codebook may support four-antenna-port partial coherent transmission with any quantity of layers within a range of [1, 4], which greatly improves transmission flexibility. In addition, different requirements such as power equalization between antenna ports or power equalization between streams may be met. In addition, based on partial coherent transmission, on a same time-frequency resource, one terminal device may send different signal streams based on different antenna port groups, or send signals to different network devices based on different antenna port groups, and may further perform coherent transmission based on antennas in a same antenna port group, so as to improve signal quality.

It should be understood that the above-enumerated precoding matrices with a rank of 4 are merely examples for description, and should not constitute any limitation on this application. In the second-type precoding matrix, the precoding matrix with a rank of 4 may include a matrix obtained after the structure $U_2^4$ of the precoding matrix with a rank of 4 is transformed (such as normalization processing and/or row and/or column transform), or a matrix that is different from the foregoing examples and obtained after a matrix that has a row and/or column transform relationship with any one of the structure $U_2^4$ of the precoding matrix with a rank of 4 is transformed.

3. Third-Type Precoding Matrix

Each element in the third-type precoding matrix is a non-zero element, and any two column vectors are orthogonal to each other.

That is, the third-type precoding matrix does not include a zero element.

It should be noted that, that two column vectors are orthogonal to each other means that a product of a conjugate transpose of one column vector in one precoding matrix and another column vector in a same precoding matrix is zero. Any two column vectors are orthogonal to each other, that is, a result that a product is zero may be obtained by performing the foregoing step for any two column vectors in a precoding matrix.

In a possible design, optionally, a structure of a precoding matrix with a rank of 4 meets at least one of the following:

$$U_3^4 = \begin{bmatrix} b_{k_1} & b_{k_1} & b_{k_1+x_1O} & b_{k_1+x_1O} \\ \alpha b_{k_2} & -\alpha b_{k_2} & \alpha b_{k_2+x_2O} & -\alpha b_{k_2+x_2O} \end{bmatrix},$$

or a matrix that has a row and/or column transform relationship with $U_3^4$.

$\alpha \in \{1, -1, j, -j\}$, j is an imaginary unit, $b_{k_1}, b_{k_2}, b_{k_1+x_1O_1}$, and $b_{k_2+x_2O_2}$ are discrete Fourier transform DFT vectors and meet $$b_i = \begin{bmatrix} 1 \\ e^{j\frac{2\pi i}{N/2 \cdot O}} \end{bmatrix}, i = \{k_1, k_2, k_1+x_1O, k_2+x_2O\},$$

$$0 \le i \le \frac{N}{2} \cdot O - 1,$$

i is an integer, N is an antenna port quantity, and N=4. For a codebook with four antenna ports, a value of O may be 2, and when O=2, $x_1 \in \{0, 1\}$, and $x_2 \in \{0, 1\}$.

$i = \{k_1, k_2, k_1+x_1O, k_2+x_2O\}$ indicates that i may be $k_1$, $k_2$, $k_1+x_1O$, or $k_2+x_2O$. For example, $$b_{k_1} = \begin{bmatrix} 1 \\ e^{j\frac{2\pi k_1}{N/2 \cdot O}} \end{bmatrix}, b_{k_2} = \begin{bmatrix} 1 \\ e^{j\frac{2\pi k_2}{N/2 \cdot O}} \end{bmatrix}, b_{k_1+x_1O} = \begin{bmatrix} 1 \\ e^{j\frac{2\pi(k_1+x_1O)}{N/2 \cdot O}} \end{bmatrix}, \text{ and}$$

$$b_{k_2+x_2O} = \begin{bmatrix} 1 \\ e^{j\frac{2\pi(k_1+x_2O)}{N/2 \cdot O}} \end{bmatrix}.$$

$$0 \le i \le \frac{N}{2} \cdot O - 1;$$

in addition, i is an integer, indicating that any one of $\{k_1, k_2, k_1+x_1O, k_2+x_2O\}$ may be an integer in $$\left[0, \frac{N}{2} \cdot O - 1\right].$$

For example, $$0 \le k_1 \le \frac{N}{2} \cdot O - 1, 0 \le k_2 \le \frac{N}{2} \cdot O - 1,$$

$$0 \le k_1 + x_1O \le \frac{N}{2} \cdot O - 1, \text{ and } 0 \le k_2 + x_1O \le \frac{N}{2} \cdot O - 1.$$

Optionally, O may be an oversampling factor, and $x_1$ may be understood as a spacing between the DFT vector $b_{k_1}$ in the structure of the precoding matrix and a physical beam represented by the DFT vector, that is, an oversampling factor whose beam spacing difference is $x_1$ times. Similarly, $x_2$ may be understood as a spacing between the DFT vector $b_{k_2}$ in the structure of the precoding matrix and a physical beam represented by the DFT vector, that is, an oversampling factor whose beam spacing difference is $x_2$ times.

Optionally, a structure of a precoding matrix with a rank of 3 meets at least one of the following:

$$U_3^3 = \begin{bmatrix} b_{k_1} & b_{k_1} & b_{k_1+x_1O} \\ \alpha b_{k_2} & -\alpha b_{k_2} & ab_{k_2+x_2O} \end{bmatrix},$$

a matrix that has a row and/or column transform relationship with $U_3^3$, or a matrix including any three columns in $U_3^4$, or a matrix including any three columns in the matrix that has a row and/or column transform relationship with $U_3^4$.

Optionally, a structure of a precoding matrix with a rank of 2 meets at least one of the following:

$$U_3^2 = \begin{bmatrix} b_{k_1} & b_{k_1+x_1O} \\ \alpha b_{k_2} & ab_{k_2+x_2O} \end{bmatrix},$$

a matrix that has a row and/or column transform relationship with $U_3^2$, or a matrix including any two columns in $U_3^4$, or a matrix including any two columns in the matrix that has a row and/or column transform relationship with $U_3^4$.

Optionally, a structure of a precoding matrix with a rank of 1 meets at least one of the following:

$$U_3^1 = \begin{bmatrix} b_{k_1} \\ \alpha b_{k_2} \end{bmatrix},$$

or a matrix that has a row and/or column transform relationship with $U_3^1$, or a matrix including any column in $U_3^4$, or a matrix including any column in the matrix that has a row and/or column transform relationship with $U_3^4$.

It should be understood that the foregoing enumerates a plurality of possible forms of structures of precoding matrices in codebooks corresponding to different ranks. However, this should not constitute any limitation on this application. In the third-type precoding matrix, the structure of the precoding matrix may include at least one of the foregoing examples, or may include a matrix that has a row and/or column transform relationship with any one of the foregoing examples and that is different from the foregoing examples. In addition, any precoding matrix obtained through normalization processing and/or row/column relationship transform based on the structure of any possible precoding matrix provided above should fall within the protection scope of this application. For brevity, examples are not enumerated herein one by one.

In addition, it should be noted that, in this embodiment of this application, different from an existing (for example, an LTE protocol) codebook, in a precoding matrix used for coherent transmission provided in this application, two discrete Fourier transform (DFT) vectors included in each column vector may be two different DFT vectors, and are not distinguished only by using a phase factor α. For ease of understanding, FIG. 3 is a schematic diagram of an antenna port.

Figure 3:
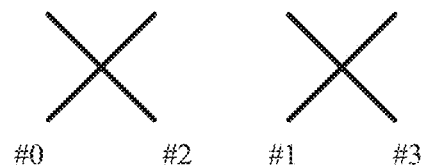
FIG. 3 is a schematic diagram of an antenna port according to an embodiment of this application.

Antenna port groups in FIG. 3 may include two groups of antenna ports, and each X in the figure represents an antenna port group including two antenna ports in different polarization directions. An antenna port #0 and an antenna port #1 are antenna ports in a same polarization direction, and may be corresponding to a same DFT vector, for example, denoted as $b_1$. An antenna port #2 and an antenna port #3 are antenna ports in a same polarization direction, and may be corresponding to a same DFT vector, for example, denoted as $b_2$, where $b_1$ and $b_2$ are orthogonal to each other. Alternatively, an antenna port #0 and an antenna port #2 are one group of antenna ports in different polarization directions, and may be corresponding to a same DFT vector, for example, denoted as $b_1$. An antenna port #1 and an antenna port #3 are another group of antenna ports in different polarization directions, and may be corresponding to a same DFT vector, for example, denoted as $b_2$, where $b_1$ and $b_2$ are orthogonal to each other. In this embodiment of this application, a rank of 1 is used as an example. A structure of a preceding matrix may be $$U_3^1 = \begin{bmatrix} b_{k_1} \\ \alpha b_{k_2} \end{bmatrix},$$

which is different from a structure $$\begin{bmatrix} b_{k_1} \\ \alpha b_{k_1} \end{bmatrix}$$

of a precoding matrix in an existing codebook. Therefore, it is not necessary to require that two DFT vectors that constitute a same column vector point to a same beam direction. In this way, a selection range of the precoding matrix may be expanded, so that a minimal Grassmannian distance of the codebook is increased, thereby facilitating system performance improvement.

To facilitate understanding of the structures of the precoding matrices provided above, the following describes in detail the above-enumerated structures of the precoding matrices with reference to detailed embodiments.

It is assumed that an antenna port quantity N is 4 and an oversampling factor O is 2, and $b_i$ may be obtained as follows:

$$b_i = \begin{bmatrix} 1 \\ 1 \end{bmatrix}, i = 0;$$

$$b_i = \begin{bmatrix} 1 \\ j \end{bmatrix}, i = 1;$$

$$b_i = \begin{bmatrix} 1 \\ -1 \end{bmatrix}, i = 2; \text{ and}$$

$$b_i = \begin{bmatrix} 1 \\ -j \end{bmatrix}, i = 3.$$

For example, if $k_1=0$ and $k_2=2$, the following may be obtained:

$$b_0 = \begin{bmatrix} 1 \\ 1 \end{bmatrix}, \text{ and } b_2 = \begin{bmatrix} 1 \\ -1 \end{bmatrix}.$$

If a value of $\alpha$ is 1, an obtained structure of the precoding matrix with a rank of 1 may be $$\begin{bmatrix} 1 \\ 1 \\ 1 \\ -1 \end{bmatrix}.$$

After normalization processing, for example, multiplication by a normalization coefficient ½, an obtained precoding matrix with a rank of 1 may be $$\frac{1}{2} \begin{bmatrix} 1 \\ 1 \\ 1 \\ -1 \end{bmatrix}.$$

Herein, the normalization coefficient ½ may be used to implement power equalization between antenna ports.

Given $x_1=1$ and $x_2=1$, an obtained structure of a precoding matrix with a rank of 4 may be $$\begin{bmatrix} 1 & 1 & 1 & 1 \\ 1 & 1 & -1 & -1 \\ 1 & -1 & 1 & -1 \\ -1 & 1 & 1 & -1 \end{bmatrix}.$$

After normalization processing, for example, multiplication by a normalization coefficient ¼, an obtained precoding matrix with a rank of 4 may be $$\frac{1}{4} \begin{bmatrix} 1 & 1 & 1 & 1 \\ 1 & 1 & -1 & -1 \\ 1 & -1 & 1 & -1 \\ -1 & 1 & 1 & -1 \end{bmatrix}.$$

Herein, the normalization coefficient ¼ may be used to implement power equalization between streams.

A structure of a precoding matrix with a rank of 2 may include any two columns in the structure of the precoding matrix with a rank of 4. For example, the structure may be $$\begin{bmatrix} 1 & 1 \\ 1 & 1 \\ 1 & -1 \\ -1 & 1 \end{bmatrix}.$$

After normalization processing, for example, multiplication by a normalization coefficient $$\frac{1}{\sqrt{8}},$$

an obtained precoding matrix with a rank of 2 may be $$\frac{1}{\sqrt{8}} \begin{bmatrix} 1 & 1 \\ 1 & 1 \\ 1 & -1 \\ -1 & 1 \end{bmatrix}.$$

Herein, the normalization coefficient $$\frac{1}{\sqrt{8}}$$

may be used to implement power equalization between streams.

A structure of a precoding matrix with a rank of 3 may include any three columns in the structure of the precoding matrix with a rank of 4. For example, the structure may be $$\begin{bmatrix} 1 & 1 & 1 \\ 1 & 1 & -1 \\ 1 & -1 & 1 \\ -1 & 1 & 1 \end{bmatrix}.$$

After normalization processing, for example, multiplication by a normalization coefficient $$\frac{1}{\sqrt{12}},$$

an obtained precoding matrix with a rank of 3 may be $$\frac{1}{\sqrt{12}} \begin{bmatrix} 1 & 1 & 1 \\ 1 & 1 & -1 \\ 1 & -1 & 1 \\ -1 & 1 & 1 \end{bmatrix}.$$

Herein, the normalization coefficient $$\frac{1}{\sqrt{12}}$$

may be used to implement power equalization between streams.

For another example, if $k_1=0$ and $k_2=0$, the following may be obtained:

$$b_0 = \begin{bmatrix} 1 \\ 1 \end{bmatrix}.$$

If a value of $\alpha$ is j, $x_1=1$, and $x_2=1$, an obtained structure of the precoding matrix with a rank of 4 may be $$\begin{bmatrix} 1 & 1 & 1 & 1 \\ 1 & 1 & -1 & -1 \\ j & -j & j & -j \\ j & -j & -j & j \end{bmatrix}.$$

After normalization processing, for example, multiplication by a normalization coefficient ¼, an obtained precoding matrix with a rank of 4 may be $$\frac{1}{4}\begin{bmatrix} 1 & 1 & 1 & 1 \\ 1 & 1 & -1 & -1 \\ j & -j & j & -j \\ j & -j & -j & j \end{bmatrix}.$$

Herein, the normalization coefficient ¼ may be used to implement power equalization between antenna ports.

For another example, if $k_1=1$ and $k_2=1$, the following may be obtained:

$$b_1 = \begin{bmatrix} 1 \\ j \end{bmatrix}.$$

If a value of $\alpha$ is j, $x_1=1$, and $x_2=1$, an obtained structure of the preceding matrix with a rank of 4 ma be $$\begin{bmatrix} 1 & 1 & 1 & 1 \\ j & j & -j & -j \\ 1 & -1 & 1 & -1 \\ j & -j & -j & j \end{bmatrix}.$$

After normalization processing, for example, multiplication by a normalization coefficient ¼, an obtained precoding matrix with a rank of 4 may be $$\begin{bmatrix} 1 & 1 & 1 & 1 \\ j & j & -j & -j \\ 1 & -1 & 1 & -1 \\ j & -j & -j & j \end{bmatrix}.$$

Herein, the normalization coefficient ¼ may be used to implement power equalization between antenna ports.

For another example, if $k_1=1$ and $k_2=3$, the following may be obtained:

$$b_1 = \begin{bmatrix} 1 \\ j \end{bmatrix}, \text{ and } b_3 = \begin{bmatrix} 1 \\ -j \end{bmatrix}.$$

If a value of a is j, $x_1=1$, and $x_2=1$, an obtained structure of the precoding matrix with a rank of 4 may be $$\begin{bmatrix} 1 & 1 & 1 & 1 \\ j & j & -j & -j \\ j & -j & j & -j \\ 1 & -1 & -1 & 1 \end{bmatrix}.$$

After normalization processing, for example, multiplication by a normalization coefficient ¼, an obtained precoding matrix with a rank of 4 may be $$\frac{1}{4}\begin{bmatrix} 1 & 1 & 1 & 1 \\ j & j & -j & -j \\ j & -j & j & -j \\ 1 & -1 & -1 & 1 \end{bmatrix}.$$

Herein, the normalization coefficient ¼ may be used to implement power equalization between antenna ports.

It should be understood that the above-enumerated structures of the precoding matrices and precoding matrices are merely examples for description, and should not constitute any limitation on this application. In the third-type precoding matrix, the precoding matrix may further include a matrix obtained by performing row and/or column transform on any one of the above-enumerated precoding matrices.

In addition, the structures of the precoding matrices with ranks of 1, 2, or 3 may separately include any one column, two columns, or three columns in the structure of the precoding matrix with a rank of 4, and the precoding matrices with ranks of 1, 2, and 3 may be separately obtained by multiplying the structures of the precoding matrices with ranks of 1, 2, and 3 by one normalization coefficient. For example, the normalization coefficient may be $$\frac{1}{\sqrt{M \cdot N}}.$$

It should be further understood that the above-enumerated structures of the precoding matrices with ranks of 1, 2, 3, and 4 and the corresponding precoding matrices are examples for description, and should not constitute any limitation on this application. In the third-type precoding matrix, the structure of the precoding matrix may include at least one of the foregoing examples, or may include a matrix that has a row and/or column transform relationship with any one of the foregoing examples and that is different from the foregoing examples. In addition, any precoding matrix obtained through normalization processing and/or row/column relationship transform based on the structure of any possible precoding matrix provided above should fall within the protection scope of this application. For brevity, examples are not enumerated herein one by one.

In another possible design, the third-type precoding matrix includes $W_M$, where $W_M$ includes M column vectors in $W_0$, and $W_0$ and any precoding matrix u in a codebook with a rank of 1 meet the following mathematical transform relationship:

$$W_0 = I - 2uu^H/u^H u.$$

$W_M$ represents a precoding matrix with a rank of M, M≥1 and M is an integer, I is an identity matrix, and $u^H$ is a conjugate transpose matrix of u. In this embodiment of this application, for the codebook with a rank of 1, refer to a codebook with a rank of 1 provided in an existing protocol (for example, an LTE protocol). By way of example and not limitation, precoding matrices in the codebook with a rank of 1 may include:

$$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix},$$

$$\frac{1}{2}\begin{bmatrix}1\\j\\-1\\-j\end{bmatrix}, \frac{1}{2}\begin{bmatrix}1\\j\\-j\\-1\end{bmatrix}, \frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\-1\end{bmatrix},$$

$$\frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix}, \frac{1}{2}\begin{bmatrix}1\\-j\\-1\\j\end{bmatrix}, \text{ and } \frac{1}{2}\begin{bmatrix}1\\-j\\-j\\1\end{bmatrix}.$$

If any one of the above-enumerated precoding matrices in the codebook with a rank of 1 is denoted as $w_1$, optionally, a precoding matrix u in the codebook with a rank of 1 further includes $w_2$, $w_2$ is taken from $w_1'$, and a Grassmannian distance between $w_1$ and $w_2$ is greater than or equal to $$\frac{1}{\sqrt{2}},$$

and $w_1'$ and $w_1$ meet the following relationship:

$$w_1' = \begin{bmatrix}a_1 & 0 & 0 & 0\\ 0 & a_2 & 0 & 0\\ 0 & 0 & a_3 & 0\\ 0 & 0 & 0 & a_4\end{bmatrix} w_1$$

$a_1 \in \{,1,-1,j,-j\}$, $a_2 \in \{1,-1,j,-j\}$, $a_3 \in \{1,-1,j,-j\}$, and $a_4 \varepsilon \{,1,-1,j,-j\}$. In this embodiment of this application, values of $a_1$, $a_2$, $a_3$, and $a_4$ may be defined in a protocol and may be the same or different. This is not limited in this application.

Herein, the Grassmannian distance between $w_1$ and $w_2$ may be defined as $$d(w_1, w_2) = \frac{1}{\sqrt{2}} \|w_1 w_1^H - w_2 w_2^H\|_F,$$

where $\|\cdot\|_F$ represents a Frobenius norm of the matrix.

In this embodiment, the Grassmannian distance between $w_1$ and $w_2$ may be enabled to be greater than or equal to $$\frac{1}{\sqrt{2}}$$

through selection of $a_1$, $a_2$, $a_3$, and $a_4$. For example, $a_1=1$, $a_2=-1$, $a_3=0$, and $a_4=1$.

It should be understood that specific calculation processes of the Householder mathematical transformation and the Grassmannian distance mentioned herein may be the same as those in the prior art. For brevity, detailed description of the specific calculation processes thereof is omitted herein.

It should be further understood that the above-enumerated codebook with a rank of 1 is merely an example for description, and should not constitute any limitation on this application. The codebook with a rank of 1 may include only the precoding matrix $w_1$ in the codebook with a rank of 1 in the above-enumerated existing protocol (for example, an LTE protocol), or may include only the precoding matrix $w_2$ with a rank of 1 proposed in this application, or may include some or all of the above-enumerated $w_1$ and $w_2$, or may even include a precoding matrix in a codebook with a rank of 1 defined in a future protocol. This is not limited in this application.

It should be further understood that, the third-type precoding matrix $W_M$ in this embodiment may include M precoding matrices in the codebook with a rank of 1, or may include a matrix that has a row and/or column transform relationship with a matrix formed by the M precoding matrices. For brevity, examples are not enumerated herein one by one.

It should be noted that $W_M$ may include M column vectors in $W_0$, but this does not mean that Wt may include any M column vectors in $W_0$. In a plurality of matrices that include any M column vectors in $W_0$, provided that $W_M$ includes at least one of the plurality of matrices, $W_M$ should fall within the protection scope claimed by this application.

In still another possible design, the third-type precoding matrix includes $W_M$, where W includes M precoding matrices in a codebook with a rank of 1, M is the rank, M≥1, and M is an integer.

The codebook with a rank of 1 may include the precoding matrix $w_1$ in the codebook with a rank of 1 in the above-enumerated existing protocol (for example, an LTE protocol), or may include the precoding matrix $w_2$ with a rank of 1 proposed in this application, or may include some or all of the above-enumerated $w_1$ and $w_2$, or may even include a precoding matrix in a codebook with a rank of 1 defined in a future protocol. This is not limited in this application.

It should be understood that, the third-type precoding matrix Wt in this embodiment may include M precoding matrices in the codebook with a rank of 1, or may include a matrix that has a row and/or column transform relationship with a matrix formed by the any M precoding matrices. For brevity, examples are not enumerated herein one by one.

It should be noted that $W_1$ may include M column vectors in the codebook with a rank of 1, but this does not mean that $W_M$ may include any M column vectors in the codebook with a rank of 1. In a plurality of matrices that include any M column vectors in the codebook with a rank of 1, provided that $W_M$ includes at least one of the plurality of matrices, $W_1$ should fall within the protection scope claimed by this application.

Based on the foregoing three types of precoding matrices, the codebook may support coherent transmission, partial coherent transmission, and non-coherent transmission of four antenna ports with any quantity of layers within a range of [1, 4], which greatly improves transmission flexibility. In addition, different requirements such as power equalization between antenna ports or power equalization between streams may be met. The terminal device may communicate with the network device on a same time-frequency resource by using a plurality of configured antennas and based on different transmission forms, which improves resource utilization and improves performance of the terminal device. In addition, in the designs of the various precoding matrices enumerated above, a selection range of the precoding matrix may be expanded, thereby increasing a minimal Grassmannian distance of the codebook, and facilitating system performance improvement.

However, it should be understood that, possible forms of four-antenna-port precoding matrices with ranks of 1 to 4 are enumerated in detail in this application, but this should not constitute any limitation on this application. Matrices obtained after mathematical transformation or variation is performed based on the above-enumerated precoding matrices should fall within the protection scope of this application. In addition, a four-antenna-port precoding matrix with a rank greater than 4 may also be obtained based on a same concept. For brevity, details are not described herein with reference to detailed precoding matrices.

Based on the foregoing design, the codebook may include at least two types of precoding matrices, but this does not mean that the codebook is divided into three mutually independent parts. The at least two types of precoding matrices may be stored in a same codebook without differentiation, or may be defined as different codebook subsets based on different types. This is not limited in this application.

In step 230, the terminal device precodes a signal based on the precoding matrix (namely, the foregoing target precoding matrix) determined by using the PMI and the RI, to obtain a precoded signal.

Optionally, step 230 specifically includes:

determining, by the terminal device, the target precoding matrix based on the PMI and the RI; and precoding, by the terminal device, the signal based on the target precoding matrix to obtain the precoded signal.

Specifically, for a specific method for determining the target precoding matrix by the terminal device based on the PMI and the RI, refer to manner 1 to manner 6 described above. For brevity, details are not described herein again. The terminal device may precode a to-be-sent signal (for example, uplink data or uplink control signaling) based on the target precoding matrix determined by using the PMI and the RI, so as to obtain a precoded signal.

It should be understood that a specific process in which the terminal device precodes the signal may be the same as that in the prior art. For brevity, a detailed description of the specific process is omitted herein.

In step 240, the terminal device sends the precoded signal.

Correspondingly, in step 240, the network device receives the precoded signal.

It should be noted that, for ease of understanding only, a procedure in which the terminal device sends the precoded signal to the network device is shown in the figure. However, actually, the terminal device may send the precoded signal to one or more network devices through a plurality of configured antenna ports. Therefore, in step 240, the network device that receives the precoded signal may include only the network device in step 210, or may include another network device in addition to the network device in step 210, or may be a different network device than the network device in step 210. For example, the terminal device receives a PMI and an RI from a network device #1, and sends the precoded signal to a network device #2. The network device #1 is an example of the network device in step 210. No limitation is imposed in this application on an object to which the terminal device sends the signal.

Optionally, in step 240, the precoded signal sent by the terminal device to the network device may include precoded uplink data and a precoded DMRS, so that the network device determines an equivalent channel matrix based on the DMRS, and further obtains, through demodulation, the uplink data sent by the terminal device.

It should be understood that a processing process after the network device receives the precoded signal in step 240 may be the same as that in the prior art. For brevity, detailed description of a specific process thereof is omitted herein.

Therefore, based on the foregoing designs, when the terminal device has a corresponding capability, the terminal device may communicate with one or more network devices in at least two transmission forms of coherent transmission, partial coherent transmission, and non-coherent transmission. Therefore, transmission flexibility of the terminal device is improved, and different transmission forms are used, so that different transmission requirements can be met, thereby facilitating resource utilization improvement.

In this embodiment of this application, the network device may indicate the target precoding matrix to the terminal device in a plurality of possible manners. With reference to different manners (including manner 1 to manner 6), the following describes in detail a specific process in which the network device indicates the target precoding matrix and the terminal device determines the target precoding matrix based on the received PMI and RI.

It should be noted that, in the following plurality of possible indication manners, the PMI may be used to indicate a codebook index, and each codebook index may be corresponding to one precoding matrix (or may be referred to as a code word), or a one-to-one correspondence between a codebook index and a precoding matrix may be stored in the codebook. That is, in a codebook corresponding to a same rank, the codebook index and the precoding matrix may be in a one-to-one correspondence. Therefore, the PMI may be used to indicate a target precoding matrix in a codebook corresponding to a rank. For brevity, a same or similar case is not described below.

Manner 1

The network device may send fourth indication information and an RI, where the RI is used to indicate a rank of a preceding matrix, and the fourth indication information is used to indicate a target precoding matrix in a codebook corresponding to the rank indicated by the RI.

In other words, in the codebook corresponding to a same rank, the fourth indication information is used to indicate one precoding matrix. Optionally, the fourth indication information may be a PMI.

For example, it is assumed that a plurality of precoding matrices are stored in the codebook, the rank may be indicated by the RI, and a codebook index corresponding to the target precoding matrix may be indicated by using the fourth indication information in the codebook corresponding to the rank.

Correspondingly, in manner 1, the terminal device receives the fourth indication information and the RI, and determines the target precoding matrix based on the fourth indication information and the RI.

Optionally, the fourth indication information and the RI are carried in DCI.

Manner 2

The network device may send fifth indication information and an RI, where the RI is used to indicate a rank of a precoding matrix, the fifth indication information may include two indication fields, a first indication field in the two indication fields indicates at least one type of a first-type precoding matrix, a second-type precoding matrix, or a third-type precoding matrix, and a second indication field in the two indication fields indicates a target precoding matrix in at least one type of precoding matrix indicated by the first indication field in a codebook corresponding to the rank indicated by the RI.

In other words, the network device may carry two levels of indication information by using one piece of indication information, so as to indicate the target precoding matrix to the terminal device. Optionally, the fifth indication information may be a PMI.

For example, it is assumed that a plurality of precoding matrices are stored in the codebook, and the rank may be indicated by the RI. In the codebook corresponding to the rank, at least two types of precoding matrices may be included, for example, at least two types of the foregoing three types of precoding matrices. The first indication field in the fifth indication information may indicate a type of an available precoding matrix. For example, the first indication field may be two bits, and a correspondence between the first indication field and a type of a precoding matrix may be shown in Table 1 below:

TABLE 1

| First indication field | Type of a precoding matrix |
|---|---|
| 00 | First-type precoding matrix |
| 01 | Second-type precoding matrix |
| 10 | Third-type precoding matrix |

It can be seen that different values in the first indication field are corresponding to different types of precoding matrices, and the second indication field may indicate a target precoding matrix in a type of an available precoding matrix (namely, a type of a precoding matrix corresponding to the first indication field). In this implementation, each type of precoding matrix may be indicated by using one set of codebook indexes. Specifically, when values in the first indication field are the same, that is, corresponding to one type of precoding matrix, a value in the second indication field may be used to uniquely indicate one precoding matrix. Therefore, in a codebook corresponding to a same rank, the first indication field and the second indication field in the fifth indication information are used to jointly indicate the target precoding matrix.

It should be understood that, in a same set of codebook indexes, each index value indicates one precoding matrix, that is, any two index values in one set of codebook indexes are different. In two different sets of codebook indexes, precoding matrices indicated by same index values may be different. For brevity, a same or similar case is not described below.

It should be further understood that the correspondence, between the first indication field and a type of a precoding matrix, enumerated in Table 1 is merely an example, and should not constitute any limitation on this application. For example, the correspondence between the first indication field and a type of a precoding matrix may also be shown in Table 2 below.

TABLE 2

| First indication field | Type of a precoding matrix |
|---|---|
| 00 | First-type precoding matrix |
| 01 | First-type precoding matrix and second-type precoding matrix |
| 10 | First-type precoding matrix, second-type precoding matrix, and third-type precoding matrix |

In this implementation, when the first indication field has different values, the second indication field is corresponding to one set of codebook indexes. When a type of a precoding matrix indicated by the first indication field is determined, precoding matrices in one or more types of precoding matrices indicated by the first indication field may be in a one-to-one correspondence with codebook indexes. The network device and the terminal device may pre-agree on a plurality of possible one-to-one correspondences between a codebook index and a precoding matrix. For example, when only the first-type precoding matrix is used, a precoding matrix in the first-type precoding matrix may be corresponding to one set of codebook indexes, and each codebook index is corresponding to one precoding matrix. When only the first-type precoding matrix and the second-type precoding matrix are used, precoding matrices in the first-type precoding matrix and the second-type precoding matrix may be corresponding to one set of codebook indexes, and each codebook index is corresponding to one preceding matrix. When the first-type precoding matrix, the second-type precoding matrix, and the third-type precoding matrix are used, precoding matrices in the first-type preceding matrix, the second-type precoding matrix, and the third-type precoding matrix may be corresponding to one set of codebook indexes, and each codebook index is corresponding to one precoding matrix. It may be understood that, when only one or two types of precoding matrices are used, a bit quantity of a codebook index may be reduced, that is, bit overheads of the fifth indication information may be reduced. A one-to-one correspondence between a codebook index and a precoding matrix may be defined in a protocol or configured by using higher layer signaling. This is not limited in this application.

Alternatively, a same set of codebook indexes may be defined for the first-type precoding matrix, the second-type precoding matrix, and the third-type preceding matrix. For example, codebook indexes of first-type precoding matrices are sequentially numbered from 0 to $X_1$, codebook indexes of second-type precoding matrices are sequentially numbered from $X_2+1$ to $X_3$, and codebook indexes of third-type precoding matrices are sequentially numbered from $X_4+1$ to $X_5$, where $X_2 \geq X_1$ and $X_4 \geq X_3$. The first indication field implicitly indicates that the first value of the codebook index is 0, $X_3+1$, or $X_5+1$. That is, the codebook index of the first-type precoding matrix and the codebook index of the second-type precoding matrix may be continuous (for example, $X_2=X_1$), or may be non-continuous (for example, $X_2>X_1$), and the codebook index of the second-type precoding matrix and the codebook index of the third-type precoding matrix may be continuous (for example, $X_4=X_3$), or may be non-continuous (for example, $X_4>X_3$). This is not limited in this application.

It should be understood that, when different types of precoding matrices are used, a method for determining a one-to-one correspondence between a codebook index and a precoding matrix may be pre-agreed, or a one-to-one correspondence between a codebook index and a precoding matrix may be dynamically changed. A method for defining a correspondence between a codebook index and a precoding matrix is not limited in this application.

Correspondingly, in manner 2, the terminal device receives the fifth indication information and the RI, and determines the target precoding matrix based on the fifth indication information and the RI.

Optionally, the fifth indication information and the RI are carried in DCI.

Manner 3

The network device sends indication information #1 (namely, an example of first indication information), sixth indication information, and an RI, where the indication information #1 is used to indicate an available codebook subset, the RI is used to indicate a rank of a target preceding matrix, and the sixth indication information is used to indicate a target precoding matrix in the available codebook subset indicated by the indication information #1 and in a codebook corresponding to the rank indicated by the RI.

Implementation A:

Optionally, the indication information #1 is a codebook subset restriction (CSR).

Optionally, the CSR is carried in higher layer signaling. The higher layer signaling may include, for example, an RRC message or a MAC-CE message.

Optionally, the sixth indication information is a PMI.

Optionally, the PMI and the RI are carried in DCI.

In this manner, in a codebook corresponding to a same RI, a value in each PMI may uniquely indicate one precoding matrix.

It should be noted that the network device may further indicate a CSR of a rank to the terminal device by using the higher layer signaling, so that the terminal device determines an available codebook subset based on the indication information #1 in a codebook corresponding to the restricted rank. Herein, the codebook subset may include at least one type of a first-type precoding matrix, a second-type precoding matrix, and a third-type precoding matrix.

In a possible design, the indication information #1 may be a bitmap. The bitmap may include a plurality of indication bits, each indication bit is corresponding to one codebook subset, and each indication bit is used to indicate whether a precoding matrix in the corresponding codebook subset is an available precoding matrix.

For example, if the codebook includes a first codebook subset (including a first-type preceding matrix, for example), a second codebook subset (including a second-type preceding matrix, for example), and a third codebook subset (including a third-type preceding matrix, for example), the three codebook subsets may be respectively corresponding to one indication bit in the bitmap. In this case, the bitmap may include three indication bits, and the three indication bits may be respectively corresponding to the three codebook subsets according to a sequence. For example, the first indication bit is corresponding to the first codebook subset, the second indication bit is corresponding to the second codebook subset, and the third indication bit is corresponding to the third codebook subset. When the indication bit is set to "0", it indicates that a precoding matrix in the indicated codebook subset is an unavailable preceding matrix. When the indication bit is set to "1", it indicates that a precoding matrix in the indicated codebook subset is an available precoding matrix.

It should be understood that when the bitmap is used to indicate whether a precoding matrix in a codebook subset is an available precoding matrix, the bitmap may indicate that preceding matrices in one or more codebook subsets are available precoding matrices at the same time. This is not limited in this application. When precoding matrices in one or more codebook subsets are available preceding matrices, for a correspondence between a codebook index and a precoding matrix, refer to related description in manner 2 above. For brevity, details are not described herein again.

The network device may indicate the target precoding matrix to the terminal device by using the PMI based on the correspondence between a codebook index and a precoding matrix.

It should be further understood that the one-to-one correspondence, between the indication bit and a type of a precoding matrix, enumerated above is merely an example for description, and should not constitute any limitation on this application. A correspondence between each indication bit and a type of a precoding matrix may be pre-agreed. Based on the pre-agreed correspondence, the network device may indicate a type of an available preceding matrix to the terminal device. It should be further understood that information indicated by different values of the indication bits enumerated above is merely an example for description, and should not constitute any limitation on this application.

In another possible design, the indication information #1 may include one indication field, and different values of the indication field indicate that different types of precoding matrices are to be used. For example, the indication field includes two bits, and a correspondence between the indication field and a type of a precoding matrix may be shown in Table 3 below.

TABLE 3

| Indication information #1 | Type of a precoding matrix |
| --- | --- |
| 00 | First-type precoding matrix |
| 01 | Second-type precoding matrix |
| 10 | Third-type precoding matrix |

In this implementation, the network device may indicate, to the terminal device by using higher layer signaling, a set of available precoding matrices. The set of available precoding matrices may be unchanged within a period of time, or may be semi-static. Therefore, compared with the foregoing manners, when the network device sends the PMI and the RI to the terminal device by using DCI, overheads of the PMI may be reduced. This is because the network device may indicate each type of precoding matrix by using one set of codebook indexes, each set of codebook indexes may be indicated by using one set of PMIs, a plurality of sets of codebook indexes corresponding to different types of precoding matrices may be independent of each other, and a plurality of sets of PMIs used to indicate codebook indexes of different types of precoding matrices may also be independent of each other. For example, a codebook index corresponding to a $0^{th}$ precoding matrix in precoding matrices with a rank of 1 in first-type precoding matrices may be "00", and the network device may indicate the precoding matrix by using, for example, a PMI with a value of "00". A value of a PMI corresponding to a $0^{th}$ precoding matrix in precoding matrices with a rank of 1 in second-type precoding matrices may also be "00", and the network device may indicate the precoding matrix by using, for example, a PMI with a value of "00". A value of a PMI corresponding to a $0^{th}$ precoding matrix in precoding matrices with a rank of 1 in third-type preceding matrices may further be "00", and the network device may further indicate the precoding matrix by using, for example, a PMI with a value of "00". However, if the type of the precoding matrix is not indicated by using the higher layer signaling, precoding matrices with a rank of 1 in the three types of precoding matrices may need to be indicated by using a same set of PMIs. Therefore, PMIs corresponding to the $0^{th}$ precoding matrix in the precoding matrices with a rank of 1 in the first-type precoding matrices, the $0^{th}$ precoding matrix in the precoding matrices with a rank of 1 in the second-type precoding matrices, and the $0^{th}$ precoding matrix in the precoding matrices with a rank of 1 in the third-type precoding matrices need to be distinguished by using different values. When a quantity of precoding matrices included in a codebook is relatively large, relatively large bit overheads may be required. However, if the codebook is divided into three codebook subsets, a quantity of preceding matrices in each codebook subset is definitely less than a total quantity of precoding matrices in the codebook, and required bit overheads may be significantly reduced.

It should be understood that the correspondence, between a value in the indication information #1 and a type of a precoding matrix, enumerated in Table 3 is merely an example, and should not constitute any limitation on this application. For example, the correspondence between a value in the indication information #1 and a type of a precoding matrix may also be shown in Table 4 below.

TABLE 4

| Indication information #1 | Type of a precoding matrix |
| --- | --- |
| 00 | First-type precoding matrix |
| 01 | First-type precoding matrix and second-type precoding matrix |
| 10 | First-type precoding matrix, second-type precoding matrix, and third-type precoding matrix |

In this implementation, when each value of the indication information #1 is used, an indicated set of available precoding matrices may be indicated by using one set of codebook indexes, each set of codebook indexes may be indicated by using one set of PMIs, a plurality of sets of codebook indexes corresponding to a plurality of values of the indication information #1 may be independent of each other, and a plurality of sets of PMIs used to indicate codebook indexes of different types of precoding matrices may also be independent of each other. When a type of a precoding matrix indicated by the indication information #1 is determined, precoding matrices in one or more types of precoding matrices indicated by the indication information #1 may be in a one-to-one correspondence with codebook indexes. This implementation is similar to manner 2. The network device and the terminal device may pre-agree on a plurality of possible one-to-one correspondences between a codebook index and a precoding matrix. For example, when the value of the indication information #1 is "00", only the first-type precoding matrix is used, one set of codebook indexes may be used to indicate a precoding matrix in the first-type precoding matrix, and each codebook index is corresponding to one precoding matrix. When the value of the indication information #1 is "01", only the first-type precoding matrix and the second-type precoding matrix are used, one set of codebook indexes may be used to indicate precoding matrices in the first-type preceding matrix and the second-type precoding matrix, and each codebook index is corresponding to one precoding matrix. When the value of the indication information #1 is "10", the first-type precoding matrix, the second-type precoding matrix, and the third-type precoding matrix are used, one set of codebook indexes may be used to indicate preceding matrices in the first-type precoding matrix, the second-type preceding matrix, and the third-type precoding matrix, and each codebook index is corresponding to one precoding matrix. It may be understood that, when only one or two types of precoding matrices are used, a bit quantity of a codebook index may be reduced, that is, bit overheads of the PMI may be reduced.

It should be understood that the above-enumerated correspondence between different values of the indication information #1 and a type of the preceding matrix is merely an example for description for ease of understanding, and should not constitute any limitation on this application.

Implementation B:

Optionally, the indication information #1 is a PMI (for example, denoted as a PMI #1).

Optionally, the sixth indication information is a PMI (for example, denoted as a PMI #2).

The indication information #1 and the sixth indication information may be different PMIs.

Optionally, the indication information #1, the sixth indication information, and the RI are carried in DCI.

It should be understood that, the indication information #1, the sixth indication information, and the RI may be carried in same DCI or different DCI. This is not limited in this application.

A correspondence between the indication information #1 and a type of a precoding matrix may be shown in Table 3 or Table 4 above, and a specific method in which the sixth indication information is used to indicate the target preceding matrix is also described in detail above. For brevity, details are not described herein again.

Correspondingly, in manner 3, the terminal device receives the indication information #1, the sixth indication information, and the RI, and determines the target precoding matrix based on the indication information #1, the sixth indication information, and the RI.

Manner 4

The network device sends indication information #2 (namely, another example of the first indication information), sixth indication information, and an RI, where the indication information #2 is used to indicate a set of available precoding matrices, the RI is used to indicate a rank of a precoding matrix in a codebook, and the sixth indication information is used to indicate a target precoding matrix in the set of available precoding matrices indicated by the indication information #2 and in a codebook corresponding to the rank indicated by the RI.

Optionally, the indication information #2 is a CSR

Optionally, the CSR is carried in higher layer signaling. The higher layer signaling may include, for example, an RRC message or a MAC-CE message.

Optionally, the sixth indication information is a PMI.

Optionally, the PMI and the RI are carried in DCI.

In this manner, in a codebook corresponding to a same RI, a value in each PMI may uniquely indicate one precoding matrix.

It should be noted that the network device may further indicate a CSR of a rank to the terminal device by using the higher layer signaling, so that the terminal device determines an available codebook subset based on the indication information #2 in a codebook corresponding to the restricted rank. Herein, the codebook subset may include at least one type of a first-type preceding matrix, a second-type preceding matrix, and a third-type preceding matrix.

In a possible design, the indication information #2 may be a bitmap. The bitmap may include a plurality of indication bits, each indication bit is corresponding to one precoding matrix, and each indication bit is used to indicate whether the corresponding preceding matrix is an available precoding matrix.

For example, if the codebook includes a plurality of precoding matrices, the bitmap may include a plurality of indication bits, each indication bit may be corresponding to one precoding matrix in the codebook, the network device may set an indication bit corresponding to an available preceding matrix to "1", and may set an indication bit corresponding to an unavailable preceding matrix to "0".

In the codebook corresponding to the rank indicated by the RI, the available preceding matrix indicated by the indication information #2 may be indicated by using one independent set of codebook indexes. That is, a preceding matrix in the available precoding matrix in the codebook corresponding to the RI may be in a one-to-one correspondence with the codebook index. For example, the network device and the terminal device may pre-agree on a method for determining the one-to-one correspondence between a codebook index and a precoding matrix. The network device may indicate, by using the PMI, a codebook index corresponding to the target precoding matrix. For example, a value in the PMI is a codebook index.

The terminal device may determine, based on the PMI and the method that is for determining the one-to-one correspondence between a codebook index and a precoding matrix and that is pre-agreed with the network device, the target precoding matrix indicated by the codebook index.

Therefore, when only one or two types of precoding matrices are applicable, a bit quantity of the codebook index may be reduced, that is, bit overheads of the PMI may be reduced.

Correspondingly, in manner 4, the terminal device receives the indication information #2, the sixth indication information, and the RI, and determines the target precoding matrix based on the first indication information, the sixth indication information, and the RI.

Manner 5

The network device may send second indication information, where the second indication information is used to indicate a set of codebooks corresponding to a discrete Fourier transform spread OFDM (DFT-spread-OFDM) waveform.

The network device sends a PMI and an RI, where the RI is used to indicate a rank of a precoding matrix, and the PMI is used to indicate a target precoding matrix in a codebook that is corresponding to the rank indicated by the RI and that is in the codebook corresponding to the DFT-s-OFDM waveform.

Specifically, the DFT-s-OFDM waveform may be understood as a waveform in a transmission mode. The set of codebooks corresponding to the waveform may include at least one codebook corresponding to at least one rank, and each codebook includes a first-type precoding matrix and a second-type precoding matrix. Transmission based on a DFT-s-OFDM waveform may be understood as a transmission mode (for example, denoted as a transmission mode #1). The second indication information may be information indicating the set of codebooks corresponding to the DFT-s-OFDM waveform, or may be information indicating a DFT-s-OFDM waveform, or may be information indicating a transmission mode. This is not limited in this application.

Correspondingly, the terminal device receives the second indication information, the second indication information indicating the codebook corresponding to the DFT-s-OFDM waveform.

The terminal device receives the PMI and the RI, and determines the target precoding matrix based on the PMI and the RI.

After the network device indicates a type of the precoding matrix by using the second indication information, the network device may indicate the target precoding matrix by using the PMI and the RI. In the set of codebooks corresponding to the DFT-s-OFDM waveform, a precoding matrix and a codebook index may be in a one-to-one correspondence. This implementation is similar to the implementation described with reference to Table 2 in manner 2. For details, refer to related description in manner 2. For brevity, details are not described herein again.

Optionally, the second indication information is carried in higher layer signaling, for example, an RRC message or a MAC-CE message.

Manner 6

The network device may send third indication information, where the third indication information is used to indicate a set of codebooks corresponding to a cyclic prefix OFDM (CP-OFDM) waveform.

The network device sends a PMI and an RI, where the RI is used to indicate a rank of a precoding matrix, and the PMI is used to indicate a target precoding matrix in a codebook that is corresponding to the rank indicated by the RI and that is in the codebook corresponding to the CP-OFDM waveform.

Specifically, the CP-OFDM waveform may be understood as a waveform in a transmission mode. The set of codebooks corresponding to the waveform includes at least one codebook corresponding to at least one rank, and each codebook includes a first-type precoding matrix, a second-type precoding matrix, and a third-type precoding matrix. Transmission based on a CP-OFDM waveform may be understood as a transmission mode (for example, denoted as a transmission mode #2). The third indication information may be information indicating the set of codebooks corresponding to the CP-OFDM waveform, or may be information indicating a CP-OFDM waveform, or may be information indicating a transmission mode. This is not limited in this application.

Correspondingly, the terminal device receives the third indication information, and indicates, based on the third indication information, the codebook corresponding to the CP-OFDM waveform.

The terminal device receives the PMI and the RI, and determines the target precoding matrix based on the PMI and the RI.

After the network device indicates a type of the precoding matrix by using the third indication information, the network device may indicate the target precoding matrix by using the PMI and the RI. In the codebook corresponding to the CP-OFDM waveform, a precoding matrix and a codebook index may be in a one-to-one correspondence. This implementation is similar to the implementation described with reference to Table 2 in manner 2. For details, refer to related description in manner 2. For brevity, details are not described herein again.

Optionally, the third indication information is carried in higher layer signaling, for example, an RRC message or a MAC-CE message.

It should be understood that the higher layer signaling used to carry the second indication information in manner 5 and the higher layer signaling used to carry the third indication information in manner 6 may be two pieces of different higher layer signaling, or may be indicated by different indication fields of one piece of higher layer signaling, or may even be indicated by different values of a same indication field of one piece of higher layer signaling. When the higher layer signaling used to carry the second indication information in manner 5 and the higher layer signaling used to carry the third indication information in manner 6 may be two pieces of different higher layer signaling, the network device may send only at least one of the higher layer signaling used to carry the second indication information and the higher layer signaling used to carry the third indication information.

Based on the foregoing possible implementations, it may be learned that the above-enumerated fourth indication information to sixth indication information may be PMIs. However, in different implementations, content indicated by the PMIs may be different, and information indicated by the PMIs in different implementations may be determined with reference to related description above. For brevity, details are not described herein again. In other words, the network device may send one or more PMIs to the terminal device. A quantity of PMIs is not limited in this application.

Still further, in any one of the foregoing possible implementations, if a type of an available precoding matrix includes first-type precoding matrices, the network device may further indicate a type in available first-type preceding matrices. For example, at least one of type A, type B, or type C in the first-type precoding matrices is indicated by using higher layer signaling. By way of example and not limitation, the higher layer signaling may include an RRC message or a MAC-CE message.

It should be understood that the above-enumerated specific forms of the higher layer signaling are merely examples for description, and should not constitute any limitation on this application. The higher layer signaling may be signaling from an RRC layer, a MAC layer, or another protocol layer different from a physical layer.

It should be understood that the above-enumerated precoding matrices are only possible forms of the precoding matrices provided in this application, and should not constitute any limitation on this application. Precoding matrices obtained by performing row and/or column transform or other mathematical transformation on the forms of the precoding matrices provided in this application should fall within the protection scope of this application.

It should be noted that, in a possible implementation, the network device and the terminal device may store one or more of the following:

(a) a parameter used to obtain any one of the precoding matrices enumerated in the foregoing implementations, where any one of the foregoing precoding matrices may be obtained based on the parameter, for example, the parameter may include but is not limited to the above-enumerated codebook configuration parameter;

(b) any one of the precoding matrices enumerated in the foregoing implementations;

(c) a matrix extended based on any one of the precoding matrices enumerated in the foregoing implementations;

(d) a matrix obtained by performing row/column transform on any one of the precoding matrices enumerated in the foregoing implementations;

(e) a matrix extended based on a matrix obtained by performing row/column transform on any one of the precoding matrices enumerated in the foregoing implementations; and (f) a codebook, where the codebook includes at least one of the matrices in (b), (c), (d), or (e).

It should be understood that row/column transform refers to row transform, or column transform, or row transform and column transform in this application.

The storing in this application may be storing in one or more memories. The one or more memories may be separately disposed, or may be integrated into an encoder, a decoder, a processor, or a communications apparatus. Alternatively, some of the one or more memories are separately disposed, and some of the one or more memories are integrated into a decoder, a processor, or a communications apparatus. A type of the memory may be any form of storage medium. This is not limited in this application.

It should be further understood that the foregoing "pre-agreement" may be implemented by pre-storing corresponding code or a corresponding table on devices (for example, including the terminal device and the network device) or in another manner that may be used to indicate related information, and a specific implementation thereof is not limited in this application.

The foregoing describes in detail the communication method in the embodiment of this application with reference to FIG. 2 and FIG. 3. The following describes in detail a communications apparatus in the embodiment of this application with reference to FIG. 4 to FIG. 6.

Figure 4:
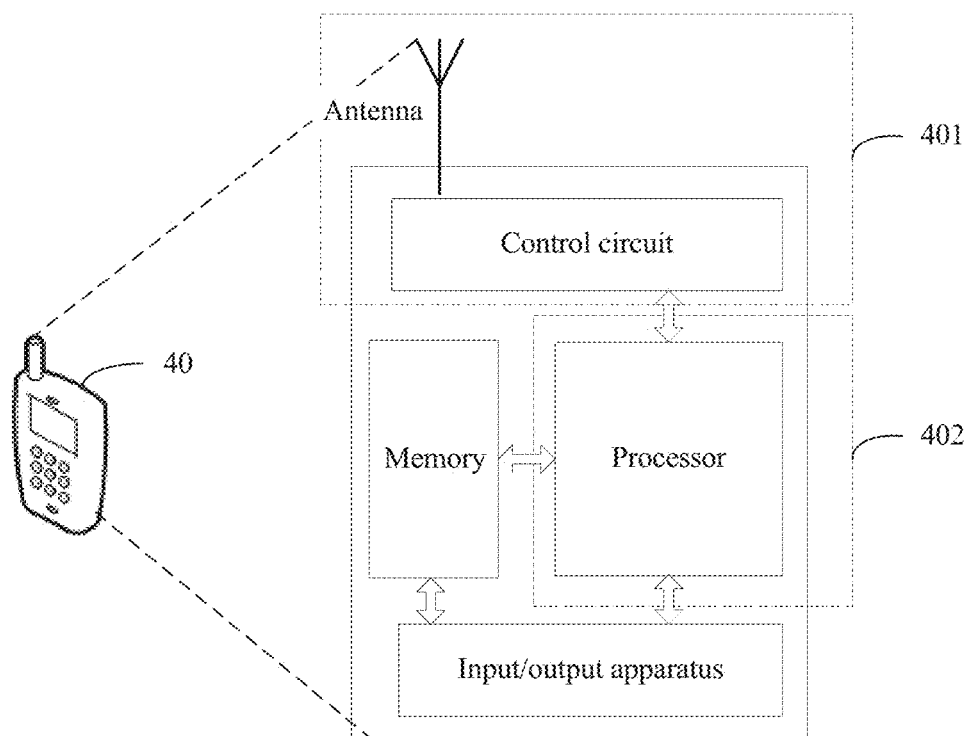
FIG. 4 is a schematic diagram of a terminal device according to an embodiment of this application.

FIG. 4 is a schematic structural diagram of a terminal device according to an embodiment of this application. The terminal device may be applied to the system shown in FIG. 1, and perform a function of the terminal device in the foregoing method embodiment. For ease of description, FIG. 4 shows only main components of the terminal device. As shown in FIG. 4, a terminal device 40 includes a processor, a memory, a control circuit, an antenna, and an input/output apparatus. The processor is mainly configured to process a communications protocol and communication data, control the entire terminal device, execute a software program, and process data of the software program. For example, the processor is configured to support the terminal device in performing an action described in the foregoing method embodiment, for example, determining a precoding matrix based on received PMI and RI, so as to precode a signal and send a precoded signal. The memory is mainly configured to store a software program and data, for example, store a correspondence, between indication information and combination information, described in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus such as a touchscreen, a display screen, or a keyboard is mainly configured to receive data entered by a user, and output data to the user.

After the terminal device is powered on, the processor may read the software program in the storage unit, interpret and execute an instruction of the software program, and process data of the software program. When the processor needs to send data by using the antenna, after performing baseband processing on the to-be-sent data, the processor outputs a baseband signal to a radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 4 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data, and the central processing unit is mainly configured to control the entire terminal device, execute a software program, and process data of the software program. Functions of the baseband processor and the central processing unit may be integrated into the processor in FIG. 4. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing a communications protocol and communication data may be embedded into the processor, or may be stored in the storage unit in a form of a software program. The processor executes the software program to implement a baseband processing function.

In this embodiment of this application, the antenna that has a transceiver function and the control circuit may be considered as a transceiver unit 401 of the terminal device 40. For example, the transceiver unit 401 is configured to support the terminal device in performing the receiving function and the sending function described in FIG. 2. The processor that has a processing function is considered as a processing unit 402 of the terminal device 40. As shown in FIG. 4, the terminal device 40 includes the transceiver unit 401 and the processing unit 402. The transceiver unit may also be referred to as a transceiver machine, a transceiver, a transceiver apparatus, or the like. Optionally, a component that is in the transceiver unit 401 and that is configured to implement a receiving function may be considered as a receiving unit, and a component that is in the transceiver unit 401 and that is configured to implement a sending function may be considered as a sending unit. In other words, the transceiver unit 401 includes the receiving unit and the sending unit. The receiving unit may also be referred to as a receiver, an input port, a receiver circuit, or the like, and the sending unit may be referred to as a transmitter machine, a transmitter, a transmitter circuit, or the like.

The processor 402 may be configured to execute an instruction stored in the memory, to control the transceiver unit 401 to receive a signal and/or send a signal, so as to complete a function of the terminal device in the foregoing method embodiment. In an implementation, a function of the transceiver unit 401 may be implemented by using a transceiver circuit or a dedicated transceiver chip.

Figure 5:
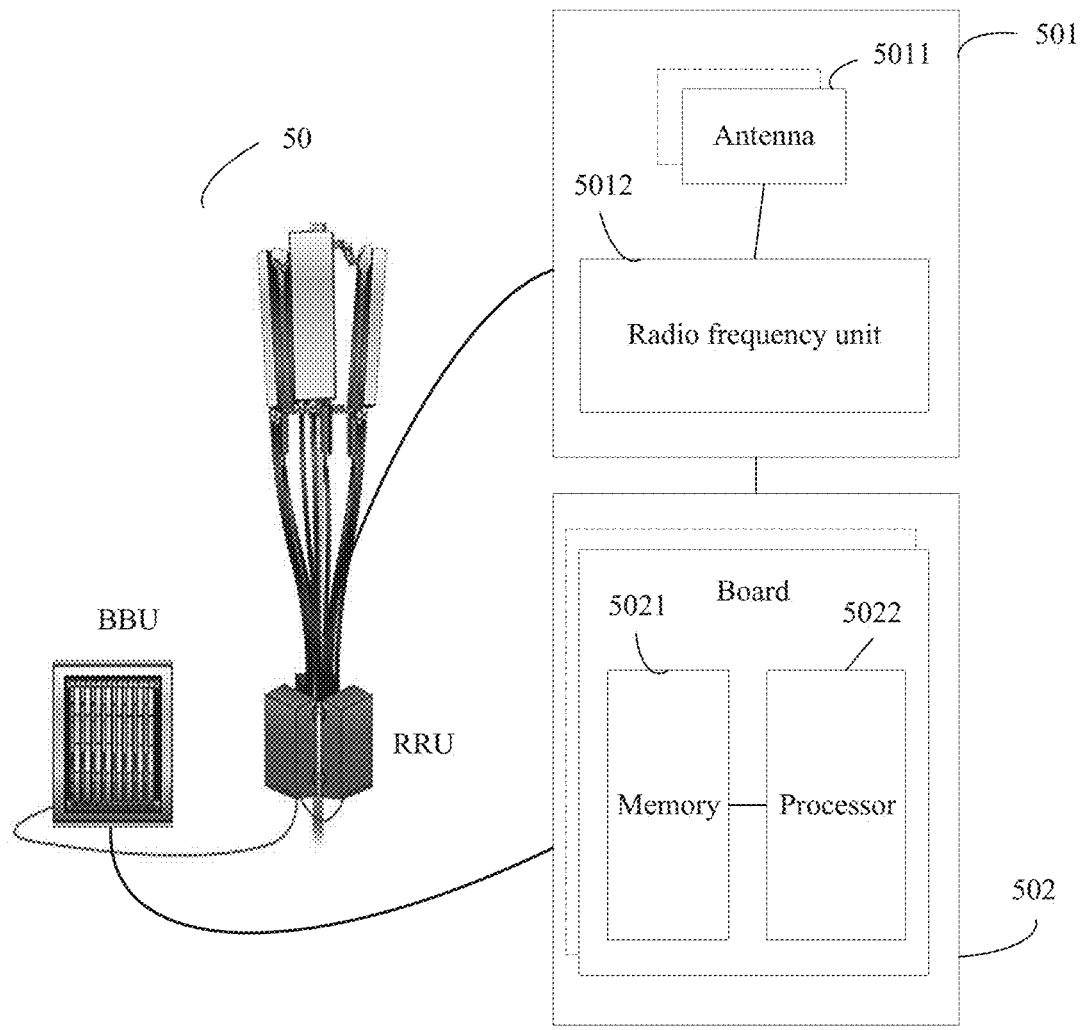
FIG. 5 is a schematic structural diagram of a network device according to an embodiment of this application.

FIG. 5 is a schematic structural diagram of a network device according to an embodiment of this application, for example, may be a schematic structural diagram of a base station. As shown in FIG. 5, the base station may be applied to the system shown in FIG. 1, and implement a function of the network device in the foregoing method embodiment. A base station 50 may include one or more radio frequency units such as remote radio units (RRU) 501 and one or more baseband units (BBU) (which may also be referred to as digital units (DU)) 502. The RRU 501 may be referred to as a transceiver unit, a transceiver, a transceiver circuit, a transceiver machine, or the like, and may include at least one antenna 5011 and a radio frequency unit 5012. The RRU 501 is mainly configured to receive and send a radio frequency signal and perform conversion between a radio frequency signal and a baseband signal, for example, configured to send the signaling message in the foregoing embodiments to a terminal device. The BBU 502 is mainly configured to perform baseband processing, control the base station, and the like. The RRU 501 and the BBU 502 may be physically disposed together, or may be physically disposed separately, to be specific, may be comprised in a distributed base station.

The BBU 502 is a control center of the base station, may also be referred to as a processing unit, and is mainly configured to implement a baseband processing function, for example, channel coding, multiplexing, modulation, and spreading. For example, the BBU (the processing unit) 502 may be configured to control the base station to perform an operation procedure related to the network device in the foregoing method embodiment.

In an instance, the BBU 502 may include one or more boards, and a plurality of boards may jointly support a radio access network (for example, an LTE network) of a single access technology, or may separately support radio access networks (such as an LTE network, a 5G network, or another network) of different access technologies. The BBU 502 further includes a memory 5021 and a processor 5022, where the memory 5021 is configured to store necessary instructions and data. For example, the memory 5021 stores the correspondence between a codebook index and a precoding matrix in the foregoing embodiment. The processor 5022 is configured to control the base station to perform a necessary action. For example, the processor 5022 is configured to control the base station to perform the operation procedure related to the network device in the foregoing method embodiment. The memory 5021 and the processor 5022 may serve one or more boards. In other words, a memory and a processor may be disposed separately on each board, or a plurality of boards may share a same memory and a same processor. In addition, a necessary circuit may be further disposed on each board.

Figure 6:
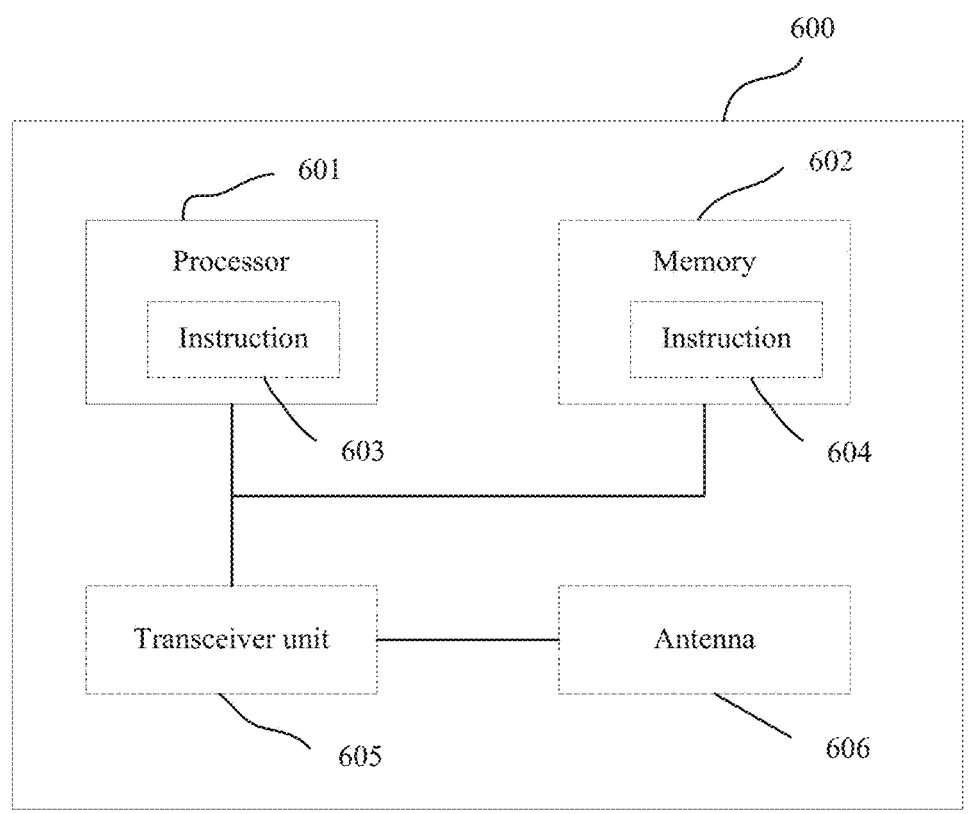
FIG. 6 is a schematic structural diagram of a communications apparatus according to an embodiment of this application.

FIG. 6 is a schematic structural diagram of a communications apparatus 600. The apparatus 600 may be configured to implement the method described in the foregoing method embodiment. For details, refer to description in the foregoing method embodiment. The communications apparatus 600 may be a chip, a network device (for example, a base station), a terminal device, another network device, or the like.

The communications apparatus 600 includes one or more processors 601. The processor 601 may be a general-purpose processor, a dedicated processor, or the like. For example, the processor 601 may be a baseband processor or a central processing unit. The baseband processor may be configured to process a communications protocol and communication data. The central processing unit may be configured to control the communications apparatus (for example, a base station, a terminal, or a chip), execute a software program, and process data of the software program. The communications apparatus may include a transceiver unit, configured to implement input (receiving) and output (sending) of a signal. For example, the communications apparatus may be a chip, and the transceiver unit may be an input and/or output circuit or a communications interface of the chip. The chip may be used by a terminal, a base station, or another network device. For another example, the communications apparatus may be a terminal, a base station, or another network device, and the transceiver unit may be a transceiver or a radio frequency chip.

The communications apparatus 600 includes one or more processors 601, and the one or more processors 601 may implement the method performed by the network device or the terminal device in the embodiment shown in FIG. 2.

In a possible design, the communications apparatus 600 includes a means for generating a PMI and an RI and a means for sending the PMI and the RI. Functions of the means for generating the PMI and the RI and the means for sending the PMI and the RI may be implemented by using one or more processors. For example, the PMI and the RI may be generated by using one or more processors, and sent by using a transceiver, an input/output circuit, or an interface of a chip. For the PMI and the RI, refer to related description in the foregoing method embodiment.

In a possible design, the communications apparatus 600 includes a means for receiving a PMI and an RI, and a means for determining a precoding matrix and precoding a signal. For the PMI, the RI, and how to determine the precoding matrix, refer to related description in the foregoing method embodiment. For example, the PMI and the RI may be received by using a transceiver, or an input/output circuit, or an interface of a chip, a precoded signal may be sent by using the transceiver, or the input/output circuit, or the interface of a chip, the precoding matrix is determined based on the PMI and the RI by using one or more processors, and a signal is precoded based on the PMI and the RI by using one or more processors.

Optionally, the processor 601 may further implement another function in addition to the method in the embodiment shown in FIG. 2.

Optionally, in a design, the processor 601 may further include an instruction 603. The instruction may run on the processor, so that the communications apparatus 600 performs the method described in the foregoing method embodiment.

In another possible design, the communications apparatus 600 may alternatively include a circuit. The circuit may implement the function of the network device or the terminal device in the foregoing method embodiment.

In still another possible design, the communications apparatus 600 may include one or more memories 602. The one or more memories 600 store an instruction 604. The instruction may run on the processor, so that the communications apparatus 600 performs the method described in the foregoing method embodiment. Optionally, the memory may further store data. Optionally, the processor may also store an instruction and/or data. For example, the one or more memories 602 may store the correspondence, between indication information and a type of a precoding matrix, described in the foregoing embodiment, or a related parameter, table, or the like in the foregoing embodiment. The processor and the memory may be disposed separately, or may be integrated together.

In yet another possible design, the communications apparatus 600 may further include a transceiver unit 605 and an antenna 606. The processor 601 may be referred to as a processing unit, and controls the communications apparatus (a terminal or a base station). The transceiver unit 605 may be referred to as a transceiver, a transceiver circuit, a transceiver machine, or the like, and is configured to implement a transceiver function of the communications apparatus by using the antenna 606.

This application further provides a communications system, including the foregoing one or more network devices and one or more terminal devices.

It should be understood that, the processor in the embodiments of this application may be a central processing unit (CPU), the processor may further be another general-purpose processor, a digital signal processor (DSP), an application-specific integrated circuit (ASIC), a field-programmable gate array (FPGA), or another programmable logical device, discrete gate or transistor logical device, discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded or executed on a computer, the procedures or functions according to the embodiments of this application are all or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving first indication information through a higher layer signaling, the first indication information indicating an available codebook subset;
   receiving downlink control information;
   determining a precoding matrix corresponding to a transmission precoding matrix indicator (TPMI) and a transmission rank obtained from the downlink control information, wherein the precoding matrix belongs to the available codebook subset indicated by the first indication information;
   preceding a signal based on the determined precoding matrix; and
   sending the preceded signal to a network device;
   wherein the available codebook subset is a first codebook subset, a second codebook subset, or a third codebook subset, the first codebook subset comprising a first-type preceding matrix, the second codebook subset comprising the first-type preceding matrix and a second-type preceding matrix, the third codebook subset comprising the first-type preceding matrix, the second-type preceding matrix, and a third-type preceding matrix; and
   wherein the first-type preceding matrix is non-coherent preceding, the second-type preceding matrix is partial-coherent preceding, and the third-type preceding matrix is coherent preceding.

2. The method according to claim 1, wherein each column vector of any matrix in the first-type preceding matrix comprises only one non-zero element, wherein non-zero elements in any two column vectors are located in different rows, wherein at least one column vector of any matrix in the second-type preceding matrix comprises at least one zero element and at least two non-zero elements, wherein each element in any matrix in the third-type preceding matrix is a non-zero element, and wherein any two column vectors of any matrix in the third-type preceding matrix are orthogonal to each other when a transmission rank is greater than 1.

3. The method according to claim 1, wherein the first indication information comprises one indication field, wherein a first value of the indication field indicates the first codebook subset, wherein a second value of the indication field indicates the second codebook subset, and wherein a third value of the indication field indicates the third codebook subset.

4. The method according to claim 1, wherein bit quantities of codebook indexes for different available codebook subsets are different, and wherein the codebook indexes are carried in the downlink control information.

5. The method according to claim 4, wherein a bit quantity of codebook indexes for the first codebook subset is less than that of codebook indexes for the third codebook subset.

6. The method according to claim 4, wherein a bit quantity of codebook indexes for the second codebook subset is less than that of codebook indexes for the third codebook subset.

7. The method according to claim 1, wherein the first-type precoding matrix comprises at least one of:

$$W_1 = \frac{1}{2}\begin{bmatrix} 1 & 0 \\ 0 & 1 \\ 0 & 0 \\ 0 & 0 \end{bmatrix},$$

a matrix that has at least one of a row or a column transform relationship with $W_1$.

8. The method according to claim 1, wherein the first-type precoding matrix comprises at least one of:

$$W_4 = \frac{1}{2}\begin{bmatrix} 1 & 0 & 0 \\ 0 & 1 & 0 \\ 0 & 0 & 1 \\ 0 & 0 & 0 \end{bmatrix},$$

or
a matrix that has at least one of a row or a column transform relationship with $W_4$.

9. The method according to claim 1, wherein the second-type precoding matrix comprises at least one of:

$$W_{11} = \frac{1}{\sqrt{8}}\begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix},$$

or
a matrix that has at least one of a row or a column transform relationship with $W_{11}$, wherein $\varphi_1 \in \{1, -1, j, -j\}$, $\varphi_2 \in \{1, -1, j, -j\}$, and j is an imaginary unit.

10. An apparatus, comprising:
a transceiver, the transceiver configured to receive first indication information through a higher layer signaling, the first indication information indicating an available codebook subset; and receive downlink control information;
at least one processor, the at least one processor configured to determine a precoding matrix corresponding to a transmission precoding matrix indicator (TPMI) and a transmission rank obtained from the downlink control information, wherein the preceding matrix belongs to the available codebook subset indicated by the first indication information; and precede a signal based on the determined preceding matrix; and
the transceiver further configured to send the precoded signal to a network device;
wherein the available codebook subset is a first codebook subset, a second codebook subset, or a third codebook subset, the first codebook subset comprising a first-type precoding matrix, the second codebook subset comprising the first-type precoding matrix and a second-type precoding matrix, the third codebook subset comprising the first-type precoding matrix, the second-type preceding matrix, and a third-type preceding matrix; and
wherein the first-type preceding matrix is non-coherent preceding, the second-type precoding matrix is partial-coherent precoding, and the third-type precoding matrix is coherent preceding.

11. The apparatus according to claim 10, wherein each column vector of any matrix in the first-type preceding matrix comprises only one non-zero element, wherein non-zero elements in any two column vectors are located in different rows, wherein at least one column vector of any matrix in the second-type precoding matrix comprises at least one zero element and at least two non-zero elements, wherein each element in any matrix in the third-type precoding matrix is a non-zero element, and wherein any two column vectors of any matrix in the third-type precoding matrix are orthogonal to each other when a transmission rank is greater than 1.

12. The apparatus according to claim 10, wherein the first indication information comprises one indication field, wherein a first value of the indication field indicates the first codebook subset, wherein a second value of the indication field indicates the second codebook subset, and wherein a third value of the indication field indicates the third codebook subset.

13. The apparatus according to claim 10, wherein bit quantities of codebook indexes for different available codebook subsets are different, and wherein the codebook indexes are carried in the downlink control information.

14. The apparatus according to claim 13, wherein a bit quantity of codebook indexes for the first codebook subset is less than that of codebook indexes for the third codebook subset.

15. The apparatus according to claim 13, wherein a bit quantity of codebook indexes for the second codebook subset is less than that of codebook indexes for the third codebook subset.

16. The apparatus according to claim 10, wherein the first-type precoding matrix comprises at least one of:

$$W_1 = \frac{1}{2}\begin{bmatrix} 1 & 0 \\ 0 & 1 \\ 0 & 0 \\ 0 & 0 \end{bmatrix},$$

or
a matrix that has at least one of a row or a column transform relationship with $W_1$.

17. The apparatus according to claim 10, wherein the first-type precoding matrix comprises at least one of:

$$W_4 = \frac{1}{2}\begin{bmatrix} 1 & 0 & 0 \\ 0 & 1 & 0 \\ 0 & 0 & 1 \\ 0 & 0 & 0 \end{bmatrix},$$

or
a matrix that has at least one of a row or a column transform relationship with $W_4$.

18. The apparatus according to claim 10, wherein the second-type precoding matrix comprises at least one of $$W_{11} = \frac{1}{\sqrt{8}}\begin{bmatrix} 1 & 0 & 1 & 0 \\ 0 & 1 & 0 & 1 \\ \varphi_1 & 0 & -\varphi_1 & 0 \\ 0 & \varphi_2 & 0 & -\varphi_2 \end{bmatrix},$$

or
a matrix that has at least one of a row or a column transform relationship with $W_{11}$, wherein
$\varphi_1 \in \{1, -1, j, -j\}$, $\varphi_2 \in \{1, -1, j, -j\}$, and j is an imaginary unit.

19. A non-transitory computer-readable storage medium comprising instructions which, when executed by at least one processor, cause an apparatus including the at least one processor to perform operations comprising:
receiving first indication information through a higher layer signaling, the first indication information indicating an available codebook subset;
receiving downlink control information;
determining a precoding matrix corresponding to a transmission precoding matrix indicator (TPMI) and a transmission rank obtained from the downlink control information, wherein the precoding matrix belongs to the available codebook subset indicated by the first indication information;
precoding a signal based on the determined precoding matrix; and
sending the precoded signal to a network device;
wherein the available codebook subset is a first codebook subset, a second codebook subset, or a third codebook subset, the first codebook subset comprising a first-type precoding matrix, the second codebook subset comprising the first-type precoding matrix and a second-type precoding matrix, the third codebook subset comprising the first-type precoding matrix, the second-type precoding matrix, and a third-type precoding matrix; and
wherein the first-type precoding matrix is non-coherent precoding, the second-type precoding matrix is partial-coherent precoding and the third-type precoding matrix is coherent precoding.

20. The storage medium according to claim 19, wherein each column vector of any matrix in the first-type precoding matrix comprises only one non-zero element, wherein non-zero elements in any two column vectors are located in different rows, wherein at least one column vector of any matrix in the second-type precoding matrix comprises at least one zero element and at least two non-zero elements, wherein each element in any matrix in the third-type precoding matrix is a non-zero element, and wherein any two column vectors of any matrix in the third-type precoding matrix are orthogonal to each other when a transmission rank is greater than 1.

\* \* \* \* \*